United States Patent
Shirahashi et al.

(10) Patent No.: US 10,557,436 B2
(45) Date of Patent: *Feb. 11, 2020

(54) METHOD AND DEVICE FOR CONTROLLING FUEL INJECTION OF DIESEL ENGINE

(71) Applicant: Mazda Motor Corporation, Aki-gun, Hiroshima (JP)

(72) Inventors: Naotoshi Shirahashi, Hiroshima (JP); Tsunehiro Mori, Aki-gun (JP); Takeshi Matsubara, Hiroshima (JP); Takeshi Inazumi, Hiroshima (JP); Tetsuya Fujioka, Aki-gun (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 21 days.

This patent is subject to a terminal disclaimer.

(21) Appl. No.: 15/963,339

(22) Filed: Apr. 26, 2018

(65) Prior Publication Data

US 2018/0334988 A1 Nov. 22, 2018

(30) Foreign Application Priority Data

May 17, 2017 (JP) .................................. 2017-098111

(51) Int. Cl.
*F02D 41/40* (2006.01)
*F02D 41/14* (2006.01)
(Continued)

(52) U.S. Cl.
CPC ......... *F02D 41/403* (2013.01); *F02D 35/025* (2013.01); *F02D 41/1454* (2013.01);
(Continued)

(58) Field of Classification Search
CPC .. F02D 41/14; F02D 41/1411; F02D 41/1454; F02D 41/34; F02D 41/40;
(Continued)

(56) References Cited

U.S. PATENT DOCUMENTS

2008/0190097 A1* 8/2008 Wada .................... F01N 3/0842
60/287
2012/0234085 A1* 9/2012 Nishida ............... F02D 41/0097
73/114.72

(Continued)

FOREIGN PATENT DOCUMENTS

JP 2012036798 A 2/2012
JP 2016217215 A 12/2016

*Primary Examiner* — John Kwon
*Assistant Examiner* — Johnny H Hoang
(74) *Attorney, Agent, or Firm* — Alleman Hall Creasman & Tuttle LLP

(57) ABSTRACT

A method of controlling a fuel injection of a diesel engine for performing a plurality of fuel injections to cause a plurality of combustions inside a cylinder in one combustion cycle, is provided, which includes performing, on compression stroke, the plurality of fuel injections at substantially constant injection intervals while increasing an injection amount as an in-cylinder oxygen concentration decreases, and performing, after the plurality of fuel injections, another fuel injection including a larger injection amount than in the plurality of fuel injections near a top dead center of the compression stroke.

8 Claims, 25 Drawing Sheets

(51) Int. Cl.
*F02D 35/02* (2006.01)
*F02D 41/38* (2006.01)
*F02B 37/013* (2006.01)
*F02B 37/00* (2006.01)

(52) U.S. Cl.
CPC ......... *F02D 41/402* (2013.01); *F02D 41/405* (2013.01); *F02B 37/004* (2013.01); *F02B 37/013* (2013.01); *F02D 2041/389* (2013.01); *F02D 2200/0618* (2013.01); *F02D 2200/1002* (2013.01)

(58) Field of Classification Search
CPC ........ F02D 41/403; F02D 41/405; F02D 1/06; F02D 1/16; F02B 19/10; F02B 19/1085; F02M 41/1411
USPC ....... 123/295–299, 434, 435, 673, 687, 690; 701/102–105, 111
See application file for complete search history.

(56) References Cited

U.S. PATENT DOCUMENTS

| | | |
|---|---|---|
| 2016/0341135 A1 | 11/2016 | Shirahashi et al. |
| 2017/0184047 A1* | 6/2017 | Shirahashi ............ F02D 41/402 |
| 2017/0184048 A1* | 6/2017 | Shirahashi ................ F02B 3/12 |
| 2017/0184049 A1* | 6/2017 | Shirahashi ................ F02B 3/12 |

* cited by examiner

METHOD AND DEVICE FOR CONTROLLING FUEL INJECTION OF DIESEL ENGINE

TECHNICAL FIELD

The present disclosure relates to a method and device for controlling a fuel injection of a diesel engine, which performs a plurality of fuel injections to cause a plurality of combustions inside a cylinder in one combustion cycle.

BACKGROUND OF THE DISCLOSURE

Conventionally, various studies have been conducted to reduce noise of a diesel engine (especially noise caused by engine knocks, simply referred to as a "knocking sound" below). For example, JP2012-036798A discloses an art for calculating, as a target value of a time difference occurring between combustion pressure waves generated by a plurality of fuel injections, a time difference with which a pressure level in a high frequency range can be lowered by interference between the combustion pressure waves, and controlling a time interval of the plurality of fuel injections based on this target value. This art aims to reduce the knocking sound by controlling the time interval of the fuel injections to lower a frequency component of pressure inside a cylinder (in-cylinder pressure) to a specific frequency range (2.8 to 3.5 kHz). Note that a "combustion pressure wave" is a pressure wave generated by in-cylinder pressure sharply rising due to combustion in an engine, and corresponds to a time differentiated waveform of the in-cylinder pressure.

Meanwhile, the knocking sound which occurs in the engine has a transfer characteristic of a structural system of the engine, particularly a characteristic corresponding to a resonance frequency of the structural system of the engine. Specifically, the knocking sound tends to become louder in a frequency range including the resonance frequency of the structural system of the engine (a frequency range having a certain bandwidth formed by a combination of resonances between components provided on a main transmission path of the engine, referred as a "resonance frequency range" below). Although a structural system of an engine generally has a plurality of resonance frequency ranges, the art of JP2012-036798A is only capable of reducing the knocking sound in a specific frequency range of 2.8 to 3.5 kHz and cannot appropriately reduce the respective knocking sounds corresponding to the plurality of resonance frequency ranges.

Here, the knocking sound is a characteristic corresponding to, in addition to the resonance occurring in the structural system of the engine described above, an in-cylinder pressure level equivalent to a combustion exciting force (generally referred to as "CPL" or "Cylinder Pressure Level" and indicates a high frequency energy obtained by Fourier-transforming an in-cylinder pressure waveform with a combustion exciting force index). This CPL depends on a heat generation rate indicating a combustion mode in the cylinder, a waveform of this heat generation rate changes under an influence of environmental conditions, such as temperature and pressure, and the knocking sound receives an influence from the mode of such a waveform of the heat generation rate. Therefore, in order to appropriately reduce the knocking sound, it is desirable to set the time interval of the plurality of fuel injections based on a timing at which the heat generation rate, reflecting the influence of the environmental conditions, reaches the highest value (peak).

In view of this point, for example, JP2016-217215A discloses an art for reducing a knocking sound corresponding to a resonance frequency of a structural system of an engine. In this art, a time interval of a plurality of fuel injections is controlled so that valley portions of a waveform indicating a frequency characteristic of a combustion pressure wave generated by a plurality of combustions fall within the respective plurality of resonance frequency ranges of the structural system of the engine. Thus, the knocking sounds corresponding to the respectively resonance frequency ranges are reduced.

Hereinafter, the fuel injection control performed to reduce the knocking sound corresponding to the specific frequency of the engine (typically, the resonance frequency of the structural system) as described in JP2016-217215A is suitably referred to as "frequency control."

Within a low load range of the diesel engine, since the combustion noise level becomes higher than mechanical noise, traveling noise, intake and exhaust sounds, etc., the knocking sound becomes more noticeable. Although details will be described later, according to research conducted by the present inventors, it was found that performing the plurality of fuel injections before a main injection to cause continuous combustions in the cylinder results in lowering the combustion noise level. However, if an ignition environment degrades due to a decrease in an oxygen concentration, etc., it becomes difficult to perform such continuous combustions and, as a result, the knocking sound cannot appropriately be reduced.

SUMMARY OF THE DISCLOSURE

The present disclosure is made in view of solving the issues of the conventional arts described above, and aims to provide a method and device for controlling a fuel injection of a diesel engine, which appropriately reduce a knocking sound even if an ignition environment degrades.

In order to solve the issues described above, according to one aspect of the present disclosure, a method of controlling a fuel injection of a diesel engine for performing a plurality of fuel injections to cause a plurality of combustions inside a cylinder in one combustion cycle is provided, which includes acquiring an oxygen concentration inside the cylinder, performing, on compression stroke, the plurality of fuel injections at substantially constant injection intervals while increasing an injection amount as the oxygen concentration decreases, and performing, after the plurality of fuel injections, another fuel injection including a larger injection amount than in the plurality of fuel injections, near a top dead center of the compression stroke.

According to this configuration, when performing the fuel injections including a plurality of pre-stage injections and a main injection (another fuel injection), the plurality of pre-stage injections are performed at the substantially constant injection intervals while increasing each fuel injection amount as the oxygen concentration decreases. Thus, even if an ignition environment degrades due to the decrease in the oxygen concentration, the penetration by the fuel injections is enhanced and the oxidation reaction of the fuel inside the cylinder is stimulated by the pre-stage injections with the increased injection amounts. Therefore, continuous heat generation is reliably caused prior to the main injection. As a result, an in-cylinder heat amount, and thus an in-cylinder pressure, are increased at the start of a main combustion to make the slope of the in-cylinder pressure up to the highest in-cylinder pressure caused by the main combustion less steep, and a high-frequency component of a knocking sound is suitably reduced. Therefore, according to this configuration, even if the ignition environment degrades due to the decrease in the oxygen concentration, the knocking sound is suitably reduced.

The method may further include increasing the injection amount of each of the plurality of fuel injections according to an increase in a load of the diesel engine.

As the engine load increases, although the fuel injection amount for the main injection increases and the highest in-cylinder pressure caused by the main combustion rises, according to this configuration, by increasing the fuel injection amounts of the pre-stage injections according to the increase in the engine load, the slope of the in-cylinder pressure up to the thus-increased highest in-cylinder pressure is suitably made less steep.

The method may further include increasing a ratio of the injection amount of each of the plurality of fuel injections with respect to a total injection amount for one combustion cycle, according to an increase in a load of the diesel engine.

Also with this configuration, the slope of the in-cylinder pressure up to the highest in-cylinder pressure caused by the main combustion is suitably made less steep.

The method may further include increasing, when a total injection amount for one combustion cycle is increased according to the increase in the load of the diesel engine, increase rates of the injection amounts of the plurality of fuel injections with respect to the total injection amount in a stepwise fashion.

According to this configuration, when the engine load increases, the injection amounts of the pre-stage injections close to the main injection are suitably increased so that the in-cylinder heat amount is effectively increased prior to the main combustion.

According to another aspect of the present disclosure, a fuel injection control device of a diesel engine for performing a plurality of fuel injections to cause a plurality of combustions inside a cylinder in one combustion cycle is provided, which includes a fuel supply device configured to inject fuel into the cylinder, and a controller configured to acquire an oxygen concentration inside the cylinder, the controller controlling the fuel supply device to perform, on compression stroke, the plurality of fuel injections at substantially constant injection intervals while increasing an injection amount as an oxygen concentration decreases, and perform, after the plurality of fuel injections, another fuel injection including a larger injection amount than in the plurality of fuel injections, near a top dead center of the compression stroke.

Also with this configuration, even if the ignition environment degrades due to the decrease in the oxygen concentration, continuous combustions are reliably generated in the cylinder prior to the main injection by the pre-stage injections with the increased injection amounts. Therefore, the in-cylinder heat amount, and thus the in-cylinder pressure, are increased at the start of the main combustion to make the slope of the in-cylinder pressure up to the highest in-cylinder pressure caused by the main combustion less steep, and even if the ignition environment degrades due to the decrease in the oxygen concentration, the knocking sound is suitably reduced.

The controller may control the fuel supply device to increase the injection amount of each of the plurality of fuel injections according to an increase in a load of the diesel engine.

According to this configuration, also when the engine load increases, the slope of the in-cylinder pressure up to the highest in-cylinder pressure is suitably made less steep.

The controller may control the fuel supply device to increase a ratio of the injection amount of each of the plurality of fuel injections with respect to a total injection amount for one combustion cycle, according to an increase in a load of the diesel engine.

Also with this configuration, the slope of the in-cylinder pressure up to the highest in-cylinder pressure caused by the main combustion is suitably made less steep.

The controller may control the fuel supply device to increase, when a total injection amount for one combustion cycle is increased according to the increase in the load of the diesel engine, increase rates of the injection amounts of the plurality of fuel injections with respect to the total injection amount in a stepwise fashion.

According to this configuration, when the engine load increases, the injection amounts of the pre-stage injections close to the main injection are suitably increased so that the in-cylinder heat amount is effectively increased prior to the main combustion.

DETAILED DESCRIPTION OF THE DISCLOSURE

Hereinafter, a method and device for controlling a fuel injection of a diesel engine according to one embodiment of the present disclosure are described with reference to the accompanying drawings.

<Device Structure>

Figure 1:
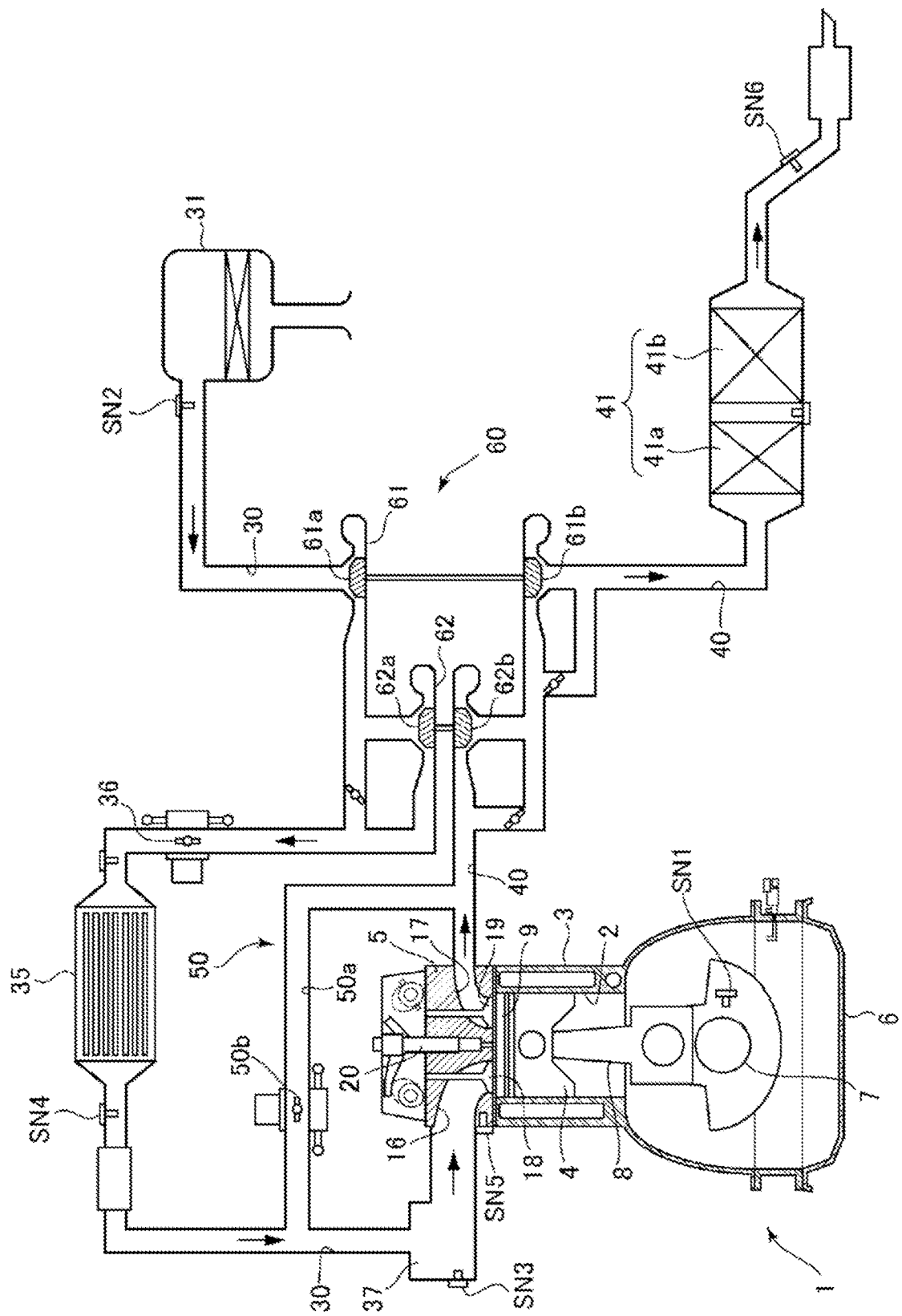
FIG. 1 is a schematic view illustrating an overall structure of a diesel engine system to which a fuel injection control device of a diesel engine according to one embodiment of the present disclosure is applied.

FIG. 1 is a schematic view illustrating an overall structure of a diesel engine system to which a fuel injection control device of a diesel engine according to one embodiment of the present disclosure is applied.

The diesel engine illustrated in FIG. 1 is a four-cycle diesel engine mounted on a vehicle as a drive source for traveling. For example, the diesel engine includes an engine body 1 having a plurality of cylinders 2 and driven by receiving a fuel mainly containing diesel fuel, an intake passage 30 which introduces air to be combusted into the engine body 1, an exhaust passage 40 which discharges exhaust gas generated in the engine body 1, an exhaust gas recirculation (EGR) device 50 which recirculates part of the exhaust gas passing through the exhaust passage 40 to the intake passage 30, and a turbocharger 60 driven by the exhaust gas passing through the exhaust passage 40. The four-cycles of the diesel engine are the intake stroke, compression stroke, combustion stroke, and exhaust stroke.

In the intake passage 30, an air cleaner 31, compressors 61a and 62a of the turbocharger 60, a throttle valve 36, an intercooler 35, and a surge tank 37 are provided in order from an upstream side. Independent passages individually communicating with the cylinders 2 are formed downstream of the surge tank 37, and gas inside the surge tank 37 is distributed to the cylinders 2 through these independent passages.

In the exhaust passage 40, turbines 62b and 61b of the turbocharger 60 and an exhaust emission control system 41 are provided in order from the upstream side.

The turbocharger 60 is structured as a two-stage turbocharging system which efficiently obtains high turbocharging force over the entire range from a low engine speed range where exhaust energy is low to a high engine speed range. That is, the turbocharger 60 includes a larger turbocharger 61 which turbocharges a large amount of air within the high engine speed range, and a smaller turbocharger 62 which efficiently turbocharges even with a low exhaust energy. The turbocharger 60 switches the turbocharging between the larger turbocharger 61 and the smaller turbocharger 62 therebetween according to an operating state of the engine (engine speed and load). The turbines 61b and 62b of the turbocharger 60 rotate by receiving the energy of the exhaust gas flowing through the exhaust passage 40, and the compressors 61a and 62a rotate in conjunction with this. Thus, the air flowing through the intake passage 30 is compressed (turbocharged).

The intercooler 35 cools the air compressed by the compressors 61a and 62a.

The throttle valve 36 opens and closes the intake passage 30. Note that in this embodiment, the throttle valve 36 is basically fully opened or at a high opening close to fully opened during operation of the engine, and is closed only when necessary, such as when the engine is stopped, to shut off the intake passage 30.

The exhaust emission control system 41 purifies hazardous components within the exhaust gas. In this embodiment, the exhaust emission control system 41 includes an oxidation catalyst 41a which oxidizes CO and HC within the exhaust gas, and a diesel particulate filter (DPF) 41b which collects soot within the exhaust gas.

The EGR device 50 recirculates the exhaust gas to the intake side. The EGR device 50 includes an EGR passage 50a connecting a part of the exhaust passage 40 upstream of the turbine 62 with a part of the intake passage 30 downstream of the intercooler 35, and an EGR valve 50b which opens and closes the EGR passage 50a. The EGR device 50 recirculates relatively high-pressure exhaust gas (high-pressure EGR gas) discharged into the exhaust passage 40 to the intake side.

The engine body 1 includes a cylinder block 3 formed therein with the cylinders 2 extending vertically, pistons 4 accommodated in the cylinders so as to be reciprocatable (vertically movable), a cylinder head 5 covering end surfaces (upper surfaces) of the cylinders from a crown surface side of the pistons 4, and an oil pan 6 disposed below the cylinder block 3 to store lubricating oil.

Each piston 4 is coupled to a crankshaft 7 which is an output shaft of the engine body 1, via a connecting rod 8. Moreover, a combustion chamber 9 is formed on the piston 4, and the fuel injected from an injector 20 which is a fuel supply device is diffused and combusts while being mixed with air in the combustion chamber 9. Then, due to expansion energy accompanying the combustion, the piston 4 reciprocates and the crankshaft 7 rotates about a center axis. The piston 4 is provided with a dynamic vibration absorber which reduces stretching resonance of the connecting rod 8.

Here, a geometric compression ratio of the engine body 1, that is, a ratio of a combustion chamber volume when the piston 4 is at a bottom dead center (BDC) and a combustion chamber volume when the piston 4 is at a top dead center (TDC) is set to be between 12:1 and 15:1 (e.g., 14:1). Although the geometric compression ratio between 12:1 and 15:1 is a significantly low value for a diesel engine, this setting is to aim for a low combustion temperature to improve emission performance and thermal efficiency.

The cylinder head 5 is formed with intake ports 16 which introduce the air supplied from the intake passage 30 into the combustion chambers 9, and exhaust ports 17 which introduce the exhaust gas generated in the combustion chambers 9 into the exhaust passage 40, respectively. The cylinder head 5 is further provided with intake valves 18 which open and close openings of the intake ports 16 from the combustion chamber 9 side, and exhaust valves 19 which open and close openings of the exhaust ports 17 from the combustion chamber 9 side, respectively.

Further, the injectors 20 which inject the fuel into the combustion chambers 9, respectively, are attached to the cylinder head 5. Each injector 20 is attached in such a posture that its tip end part on the piston 4 side is oriented toward a center of a cavity (not illustrated) formed as a recessed portion in the crown surface of the piston 4. The injector 20 is connected to a pressure accumulation chamber (not illustrated) on a common rail side via a fuel flow path. The pressure accumulation chamber stores the fuel in a highly pressured state by a fuel pump (not illustrated), and the injector 20 is supplied with the fuel from this pressure accumulation chamber and injects it into the combustion chamber 9. A fuel pressure regulator (not illustrated) to adjust injection pressure, which is pressure inside the pressure accumulation chamber (i.e., pressure of the fuel injected from the injector 20), is provided between the fuel pump and the pressure accumulation chamber.

Figure 2:
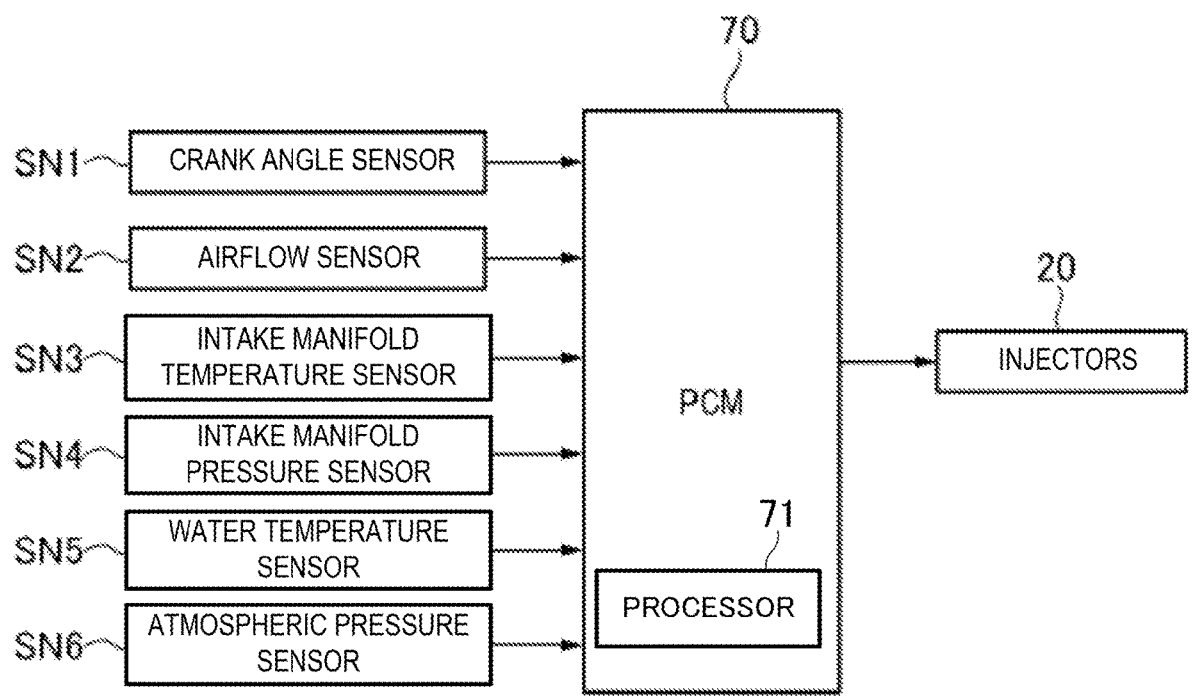
FIG. 2 is a block diagram illustrating a control system of the diesel engine according to the embodiment of the present disclosure.

Next, a control system of the diesel engine according to this embodiment will be described with reference to FIG. 2. FIG. 2 is a block diagram illustrating the control system of the diesel engine according to this embodiment. As illustrated in FIG. 2, the diesel engine of this embodiment is comprehensively controlled by a PCM (Powertrain Control Module) 70. The PCM 70 is a microprocessor comprised of a processor 71 (i.e., a central processing unit (CPU)), ROM(s), RAM(s), etc.

The PCM 70 is electrically connected to various sensors which detect an operating state of the engine.

For example, the cylinder block 3 is provided with a crank angle sensor SN1 which detects a rotational angle (crank angle) and rotational speed of the crankshaft 7. The crank angle sensor SN1 outputs a pulse signal corresponding to rotation of a crank plate (not illustrated) which integrally rotates with the crankshaft 7, and identifies, based on this pulse signal, the rotational angle and rotational speed of the crankshaft 7 (i.e., the engine speed).

The intake passage 30 is provided, at a position near the air cleaner 31 (a portion between the air cleaner 31 and the compressor 61a), with an airflow sensor SN2 which detects an amount of air (fresh air) passing through the air cleaner 31 to be sucked into each cylinder 2.

The surge tank 37 is provided with an intake manifold temperature sensor SN3 which detects a temperature of the gas inside the surge tank 37, i.e., the temperature of the gas sucked into each cylinder 2.

The intake passage 30 is provided, at a position downstream of the intercooler 35, with an intake manifold pressure sensor SN4 which detects pressure of air passing through this position of the intake passage 30, thus detects pressure of the intake air sucked into the cylinder 2.

The engine body 1 is provided with a water temperature sensor SN5 which detects a temperature of cooling water for cooling the engine body 1. Additionally, an atmospheric pressure sensor SN6 which detects atmospheric pressure is provided.

The PCM 70 controls various parts of the engine while executing various determinations and calculations based on input signals from the various sensors described above. For example, the PCM 70 controls the injector 20, the throttle valve 36, the EGR valve 50b, the fuel pressure regulator, etc. In this embodiment, as illustrated in FIG. 2, the PCM 70 mainly controls the injector 20 to execute a control regarding the fuel supplied to the cylinder 2 (fuel injection control). Note that the PCM 70 corresponds to "the fuel injection control device of the diesel engine" together with the injector 20, and functions as "the controller."

Figure 3:
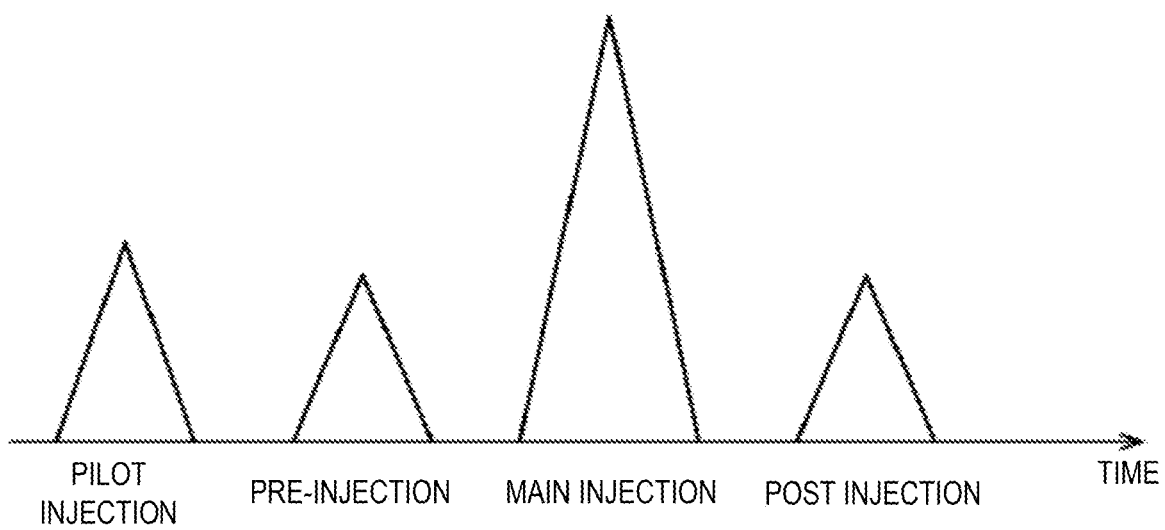
FIG. 3 is a time chart illustrating a representative fuel injection pattern applied in the embodiment of the present disclosure.

Here, a basic concept of the fuel injection control executed by the PCM 70 in this embodiment will be described with reference to FIG. 3. FIG. 3 is a time chart illustrating a representative fuel injection pattern applied in this embodiment.

In this embodiment, as illustrated in FIG. 3, the PCM 70 performs a plurality of fuel injections (multi-stage injections) to cause a plurality of combustions inside the cylinder in one combustion cycle. For example, the PCM 70 performs a pilot injection at a relatively early timing, and then performs a pre-injection at a timing relatively close to that of a main injection. In this injection pattern, the pilot injection, which is an injection first in order, is performed to increase premixing ability of the fuel and the air so as to increase an air usage rate. Moreover, the pilot injection and the pre-injection, which is an injection second in order, are performed immediately before the fuel injected in the main injection (main injected fuel) combusts, that is, immediately before a main combustion occurs, so as to cause a pre-combustion, which is a combustion with a small heat generation rate, to form a state where the main injected fuel easily combusts. In addition, the PCM 70 performs a post injection in which an amount of fuel smaller than the amount in the main injection is injected into the combustion chamber 9 after the main injection, so as to combust the soot generated in the combustion chamber 9.

Although FIG. 3 illustrates one pilot injection, the pre-injection, the main injection, and the post injection, at least one of these fuel injections (typically, the pre-injection) may be performed twice or more, or at least one of these fuel injections (typically, the post injection) may not be performed.

Moreover, the PCM 70 applies a fuel injection pattern corresponding to the operating state of the engine. That is, according to the engine load and the engine speed, the PCM 70 changes the timings and periods for performing the pilot injection, the pre-injection, the main injection and the post injection, the number of times of performing these injections, and/or whether to perform or not perform these injections.

Typically, the PCM 70 sets a basic injection timing of the main injection (hereinafter, referred to as "reference main injection timing") based on a required output corresponding to an accelerator opening controlled by a vehicle driver and the operating state of the engine. Moreover, in order to cause combustion with a small heat generation amount by the pre-injection immediately before the main injected fuel combusts so as to form a state where the main injected fuel is easily combusted, for example, the PCM 70 sets the injection timing of the pre-injection to be a timing that fuel spray injected in the pre-injection settles within the cavity formed in the crown surface of the piston 4 and relatively rich mixture gas is formed in the cavity. The PCM 70 also sets the injection timing of the post injection to be a timing that the soot generated in the combustion chamber 9 by the fuel injection performed before the post injection is appropriately combusted by the post injection.

<Basic Concept of Control>

Next, a basic concept of the control according to this embodiment will be described with reference to FIGS. 4A and 4B and the subsequent drawings.

As described above, the frequency control disclosed in JP2016-217215A reduces the knocking sounds corresponding to the plurality of frequency ranges, such as the resonance frequency component; however, it is insufficient to lower the knocking sound level as a whole. Especially within the low load range of the diesel engine, since the combustion noise level becomes higher than mechanical noise, traveling noise, intake and exhaust sounds, etc., the knocking sound becomes more noticeable. Although it may be considered to lower a highest combustion pressure in order to lower this combustion noise level, this method causes an increase in smoke amount (soot generation amount) and an increase in fuel consumption. That is, the knocking sound and the smoke amount are basically in a conflicting relationship, as are the knocking sound and the fuel consumption.

Therefore, in order to find an ideal combustion in which the knocking sound is appropriately reduced without increasing the smoke generation and the fuel consumption, the present inventors searched for an ideal combustion in terms of a CPL. First, the present inventors looked for a clue for reducing the CPL by focusing, from actual traveling scenes, on a scene where the knocking sound is quiet and a scene where the knocking sound is loud. As a result, it was found that while the knocking sound is quiet within a full engine load range where largest combustion energy (torque) is obtained, it is loud (i.e., the knocking sound increases to a noticeable level) within a low-medium engine load range on a low engine speed side. Hereinafter, the phrase "partial engine load range" in comparison to the full engine load range may suitably be used to indicate the low-medium engine load range on the low engine speed side. Typically, an operating state where the engine speed is about 1,500 rpm and the engine load is about 500 kPa belongs to this partial engine load range.

Figure 4A:
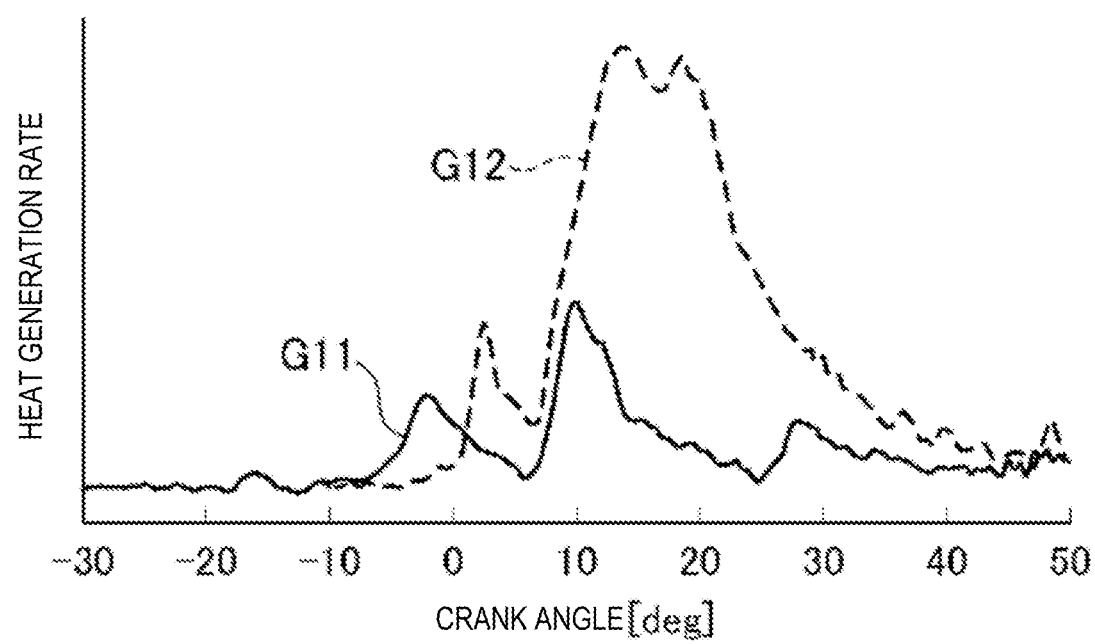
FIGS. 4A and 4B are charts illustrating a heat generation rate and a CPL in two traveling scenes where a difference between knocking sounds obtained in actual traveling scenes is large.
Figure 4B:
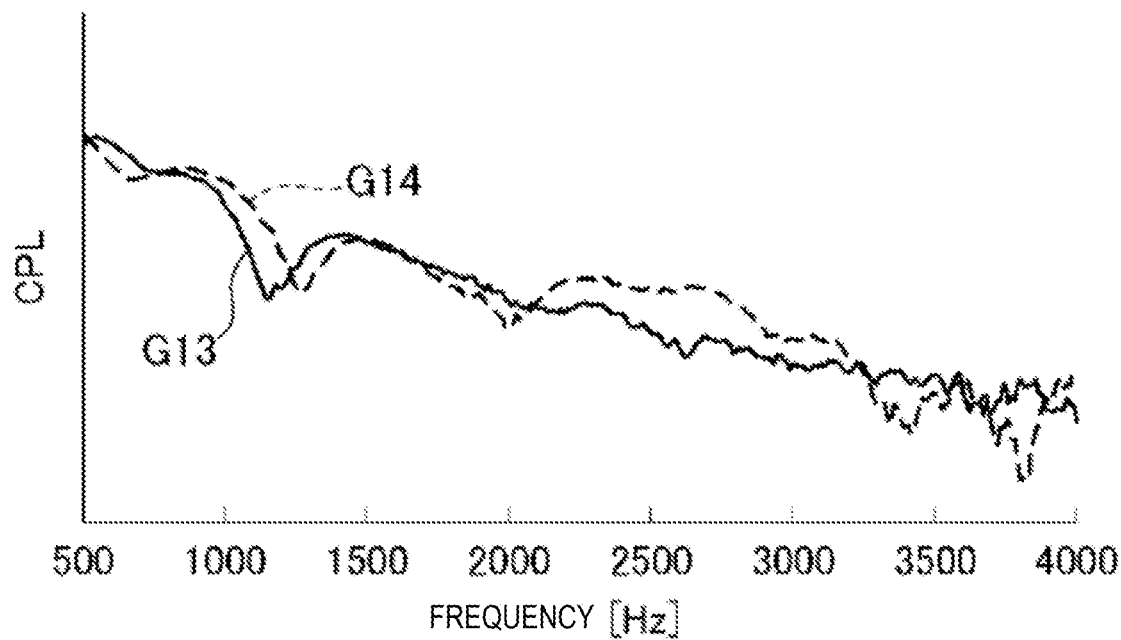

FIGS. 4A and 4B illustrate the heat generation rate and the CPL in two traveling scenes (specifically, the partial engine load range and the full engine load range) where a difference between knocking sounds obtained in the actual traveling scenes is large. FIG. 4A indicates the crank angle in a horizontal axis and the heat generation rate in a vertical axis, and FIG. 4B indicates the frequency in a horizontal axis and the CPL in a vertical axis. For example, graphs G11 and G13 indicate the heat generation rate and the CPL obtained in the traveling scene within the partial engine load range, respectively, and graphs G12 and G14 indicate the heat generation rate and the CPL obtained in the traveling scene within the full engine load range, respectively. By focusing on the difference in combustions within the partial engine load range and the full engine load range in FIGS. 4A and 4B, it can be understood that, within the full engine load range, high-frequency energy is small although the generated heat amount (torque) is large. Therefore, the present inventors tried to find by a simulation an ideal combustion waveform based on the combustion waveform within the full engine load range where the knocking sound is quiet.

Figure 5A:
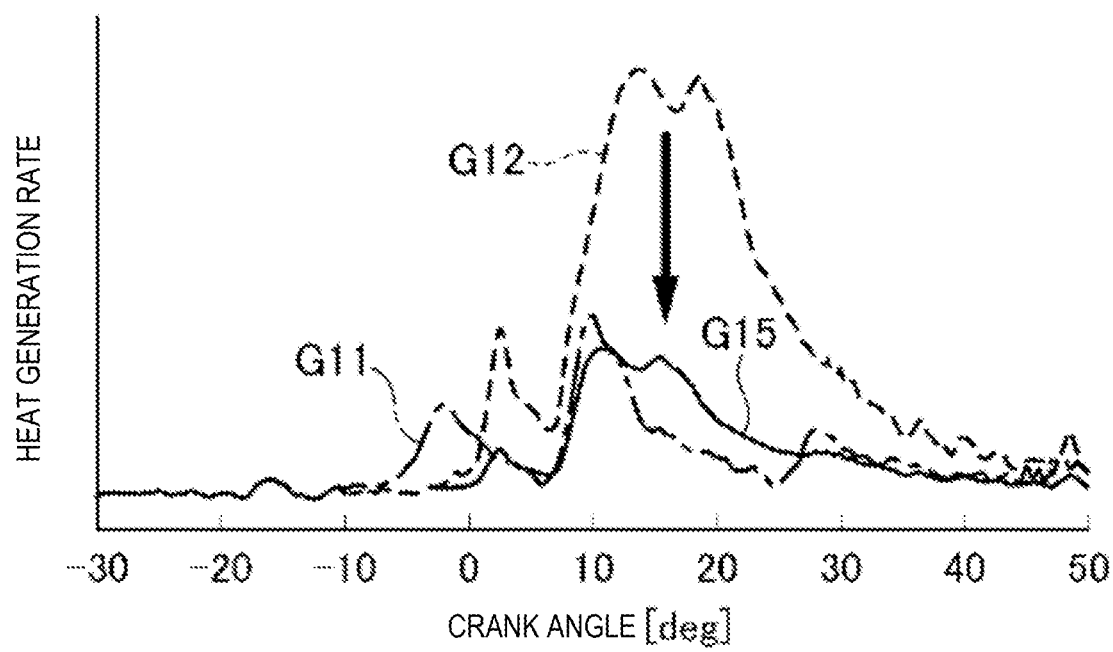
FIGS. 5A and 5B show a simulation result when a combustion within a full engine load range is reproduced within a partial engine load range.
Figure 5B:
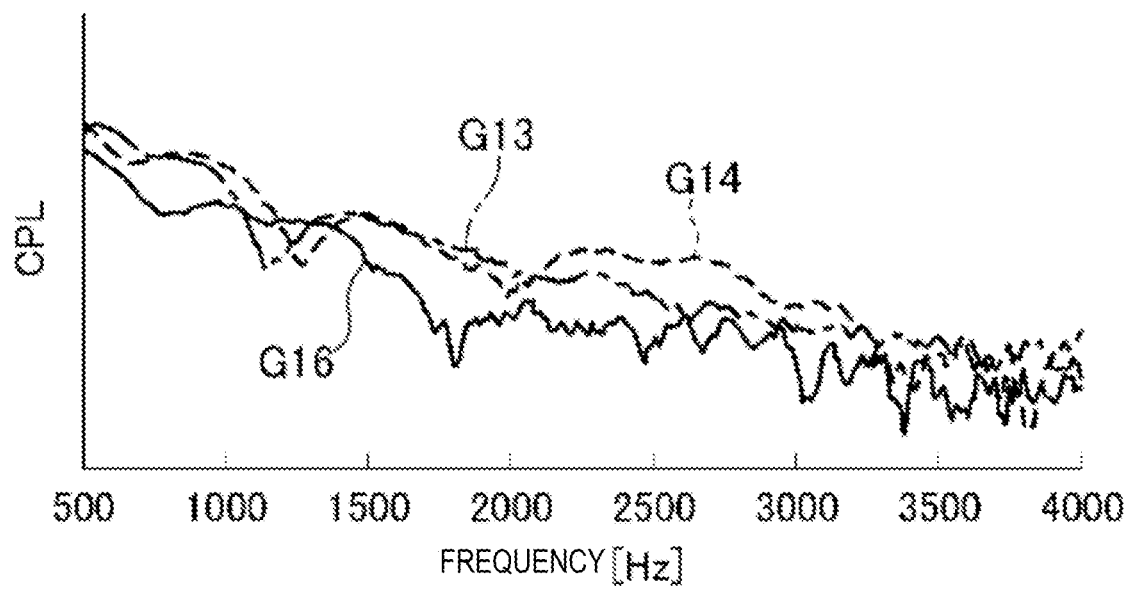

FIGS. 5A and 5B illustrate a simulation result when full-load combustion (hereinafter, referred to as "full-load combustion") is reproduced in the partial engine load range. FIG. 5A indicates the crank angle in a horizontal axis and the heat generation rate in a vertical axis, and FIG. 5B indicates the frequency in a horizontal axis and the CPL in a vertical axis. For example, the graphs G11 to G14 are the same as those in FIGS. 4A and 4B, and a graph G15 indicates a combustion waveform in which the heat release rate within the full engine load range (graph G12) is modified by a similar heat generation to adapt to the partial engine load range, and a graph G16 indicates the CPL when this modified combustion waveform of the graph G15 is applied. Based on the graph G16, it was understood that by copying the similar combustion waveform within the full engine load range to the partial engine load range, the CPL significantly decreases. Therefore, the present inventors further conducted a simulation to examine the reducible extent of the CPL.

Figure 6A:
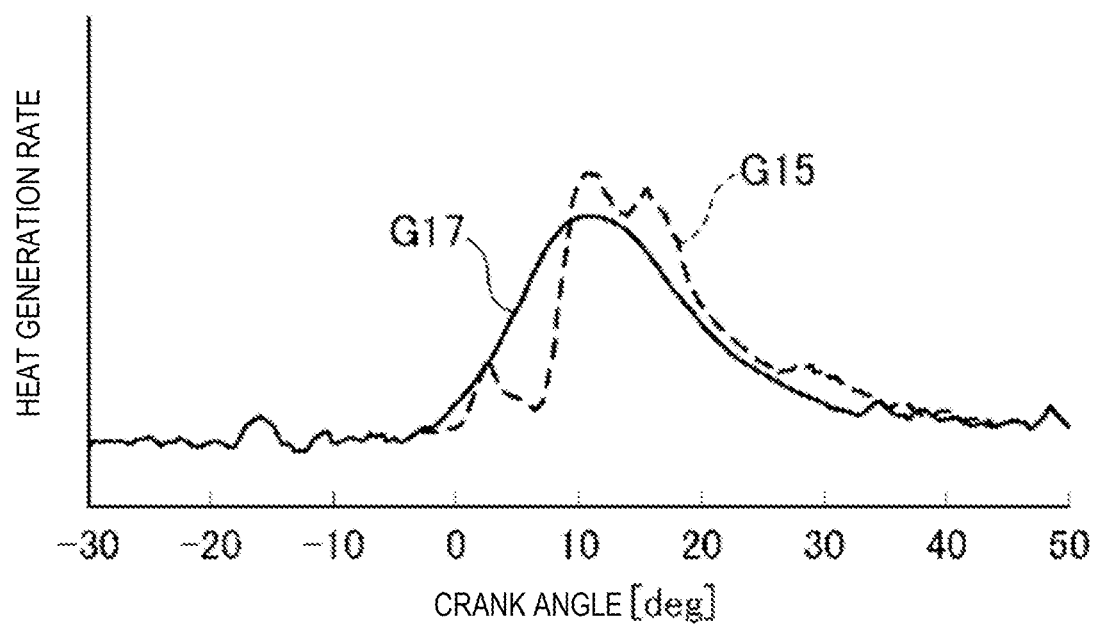
FIGS. 6A and 6B show a simulation result when a combustion waveform in which the combustion within the full engine load range is reproduced within the partial engine load range is compared with a combustion waveform which has a lowest slope of the heat generation.
Figure 6B:
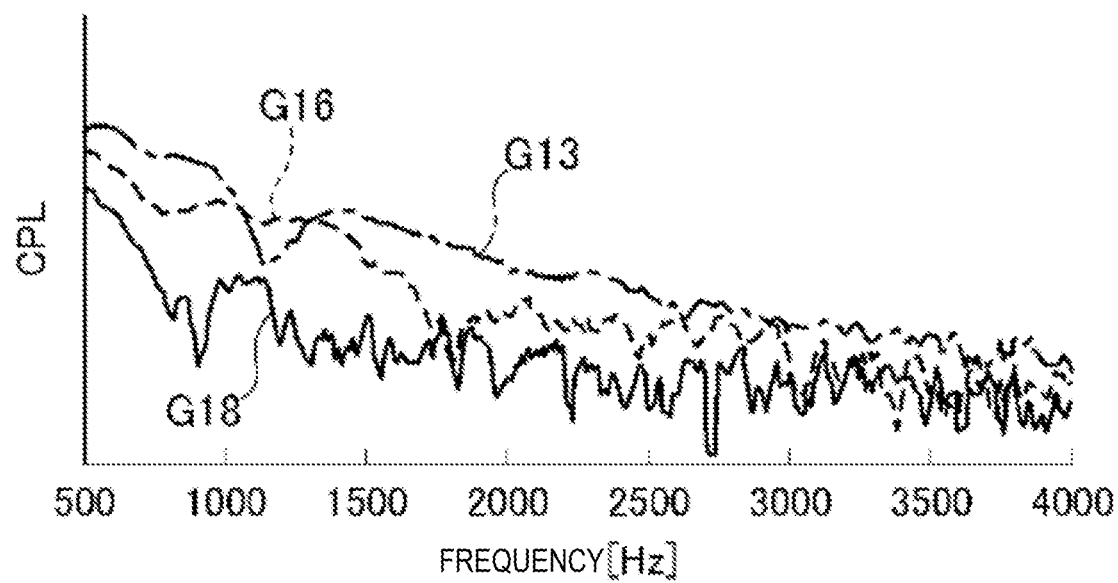

FIGS. 6A and 6B show a simulation result when the combustion waveform in which the full-load combustion is reproduced in the partial engine load range is compared with a combustion waveform which has a lowest slope of the heat generation rate. FIG. 6A indicates the crank angle in a horizontal axis and the heat generation rate in a vertical axis, and FIG. 6B indicates the frequency in a horizontal axis and the CPL in a vertical axis. For example, the graphs G13, G15, and G16 are the same as those in FIGS. 5A and 5B, and a graph G17 indicates a combustion waveform which has the lowest slope under the same torque condition as the combustion waveform reproducing in the partial engine load range the full-load combustion (graph G15). Specifically, this graph G17 indicates a combustion waveform in which the heat generation amount is increased and the combustion slope is made less steep than in the graph G15 at the rise of the heat generation rate, and also the heat generation amount at the peak of the heat generation rate is reduced than in the graph G15. Further, a graph G18 indicates the CPL when such a combustion waveform of the graph G17 is applied. By comparing this graph G18 with the graph G16 indicating the CPL in the combustion waveform reproducing in the partial engine load range the full-load combustion, it can be said that the CPL may be reduced at frequencies of 1,500 Hz and lower. Therefore, the present inventors conducted a simulation to examine a further reduction of the CPL at the frequencies of 1,500 Hz and lower.

Figure 7A:
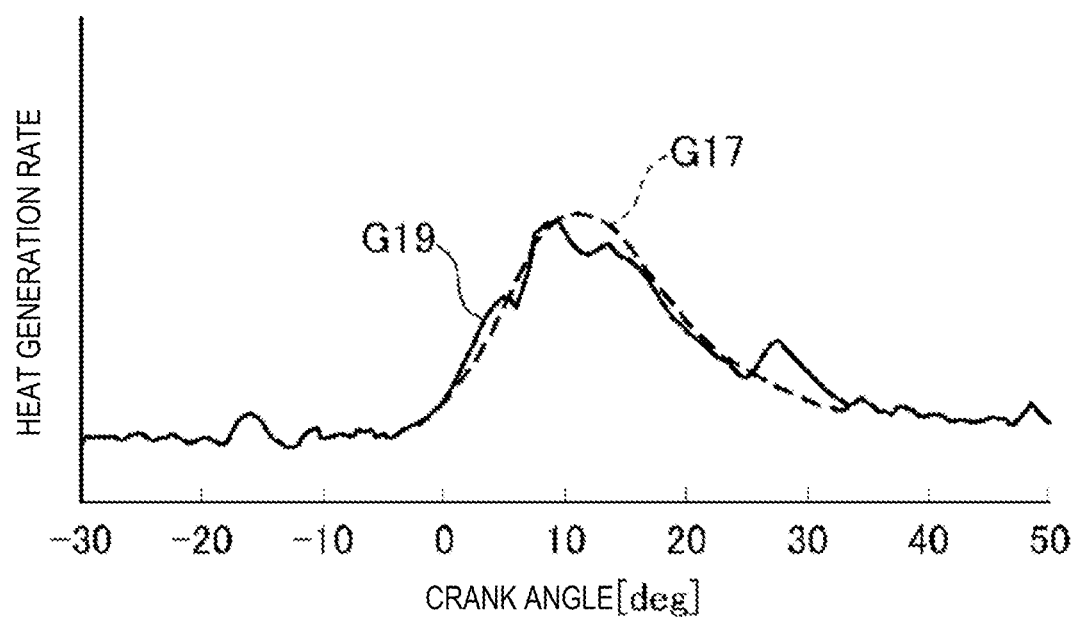
FIGS. 7A and 7B show a simulation result of a derived ideal combustion waveform.
Figure 7B:
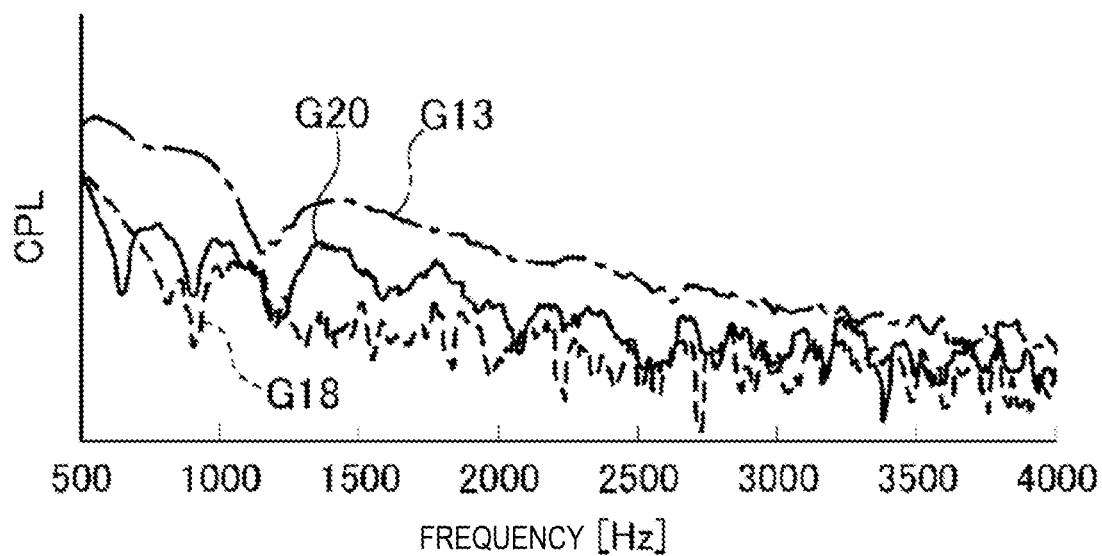

FIGS. 7A and 7B show a simulation result of a derived ideal combustion waveform. FIG. 7A indicates the crank angle in a horizontal axis and the heat generation rate in a vertical axis, and FIG. 7B indicates the frequency in a horizontal axis and the CPL in a vertical axis. For example, the graphs G13, G17, and G18 are the same as those in FIGS. 6A and 6B, and a graph G19 indicates a combustion waveform which is based on the combustion waveform having the lowest slope of heat generation (graph G17), and achievable by an actual device (hereinafter, referred to as "target combustion waveform"). It can be understood that the target combustion waveform indicated by this graph 19 is formed by substantially tracing the combustion waveform indicated by the graph G17 having the lowest slope of heat generation, except for the part of the combustion caused by the post injection. Moreover, a graph G20 indicates the CPL when such a target combustion waveform of the graph G19 is applied. Thus, it can be understood that, according to the target combustion waveform, the CPL is appropriately reduced at the frequencies of 1,500 Hz and lower.

By the simulations described above, the target combustion waveform (ideal combustion waveform) was derived from the combustion waveform reproducing the full-load combustion, in the partial engine load range. Therefore, the present inventors conducted research on a combusting function to be controlled for achieving this ideal combustion waveform. Specifically, the combusting function to be enhanced from the full-load combustion where the knocking sound is quiet was extracted. First, in order to find out the reason why the knocking sound is quiet in the full-load combustion, the present inventors compared the combustion within the partial engine load range (hereinafter, referred to as "partial-load combustion") with that within the full engine load range. The present inventors particularly examined ignition delaying periods in the partial-load combustion and the full-load combustion (the period from the start of the fuel injection to the start of the combustion).

Figure 8A:
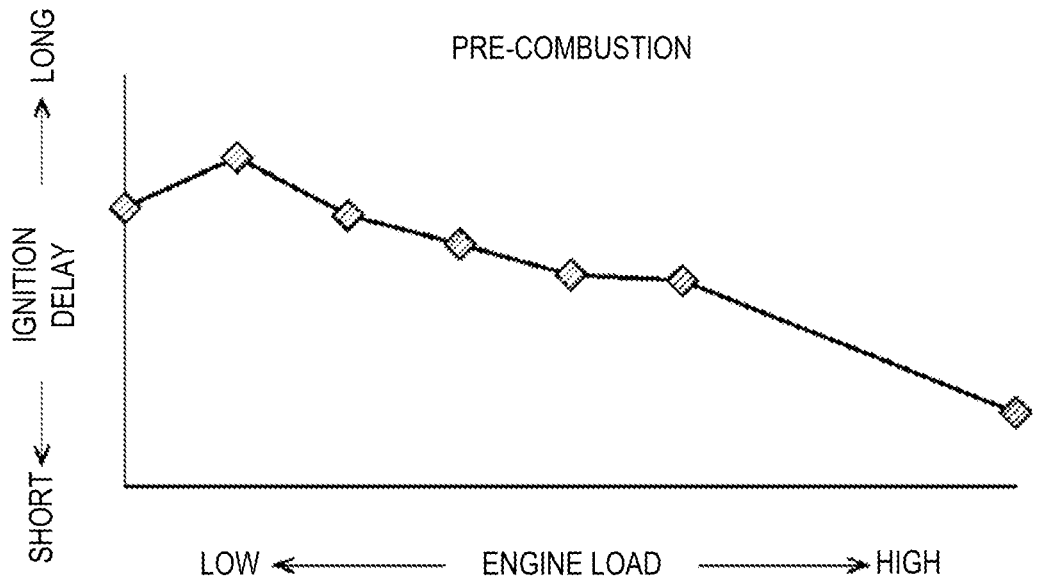
FIGS. 8A and 8B are charts illustrating a relationship between an engine load and an ignition delaying period.
Figure 8B:
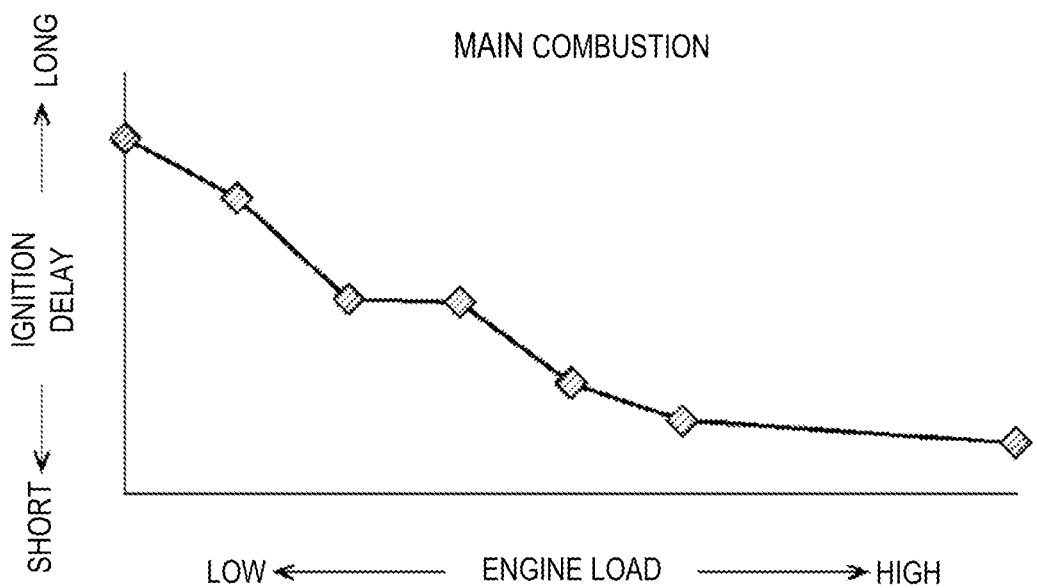

FIGS. 8A and 8B illustrate a relationship between the engine load and the ignition delaying period. FIG. 8A illustrates the engine load in a horizontal axis and the ignition delaying period of the pre-combustion (particularly, the period from the pilot injection to the peak of the pre-combustion) in a vertical axis, and FIG. 8B illustrates the engine load in a horizontal axis and the ignition delaying period of the main combustion (particularly, the period from the main injection to the start of the main combustion) in a vertical axis. It can be understood from FIGS. 8A and 8B that the ignition delaying periods of the pre-combustion and the main combustion both become shorter as the engine load increases. Particularly, the ignition delaying period is minimized within the full engine load range. Therefore, the present inventors considered a mechanism of the knocking sound reducing within the full engine load range due to the short ignition delaying period.

Here, the mechanism of improvement/degradation of the CPL due to the ignition delay are considered. First, when the ignition delaying period is long, since a time length from the start of the fuel injection until the fuel ignition is long, the amount of non-combusted fuel (pre-mixture gas amount) inside the combustion chamber is large. Therefore, when the ignition delaying period is long, a large amount of fuel combusts inside the combustion chamber, which increases the scale of combustion and degrades the CPL. On the other hand, when the ignition delaying period is short, the time length from the start of the fuel injection until the fuel ignition is short, and the amount of non-combusted fuel (pre-mixture gas amount) inside the combustion chamber is small. Therefore, it can be considered that, when the ignition delaying period is short, a small amount of fuel combusts inside the combustion chamber, which reduces the scale of combustion and improves the CPL.

For this reason, the present inventors considered to improve the CPL by shortening the ignition delaying period by adjusting the fuel injection pattern. However, although shortening the ignition delaying period improves the CPL, since the knocking sound and the smoke amount are in the trade-off relationship as described above, the smoke amount increases. Although such smoke amount needs to be taken into consideration, the present inventors first considered a manner of achieving the control of the ignition delaying period.

Figure 9:
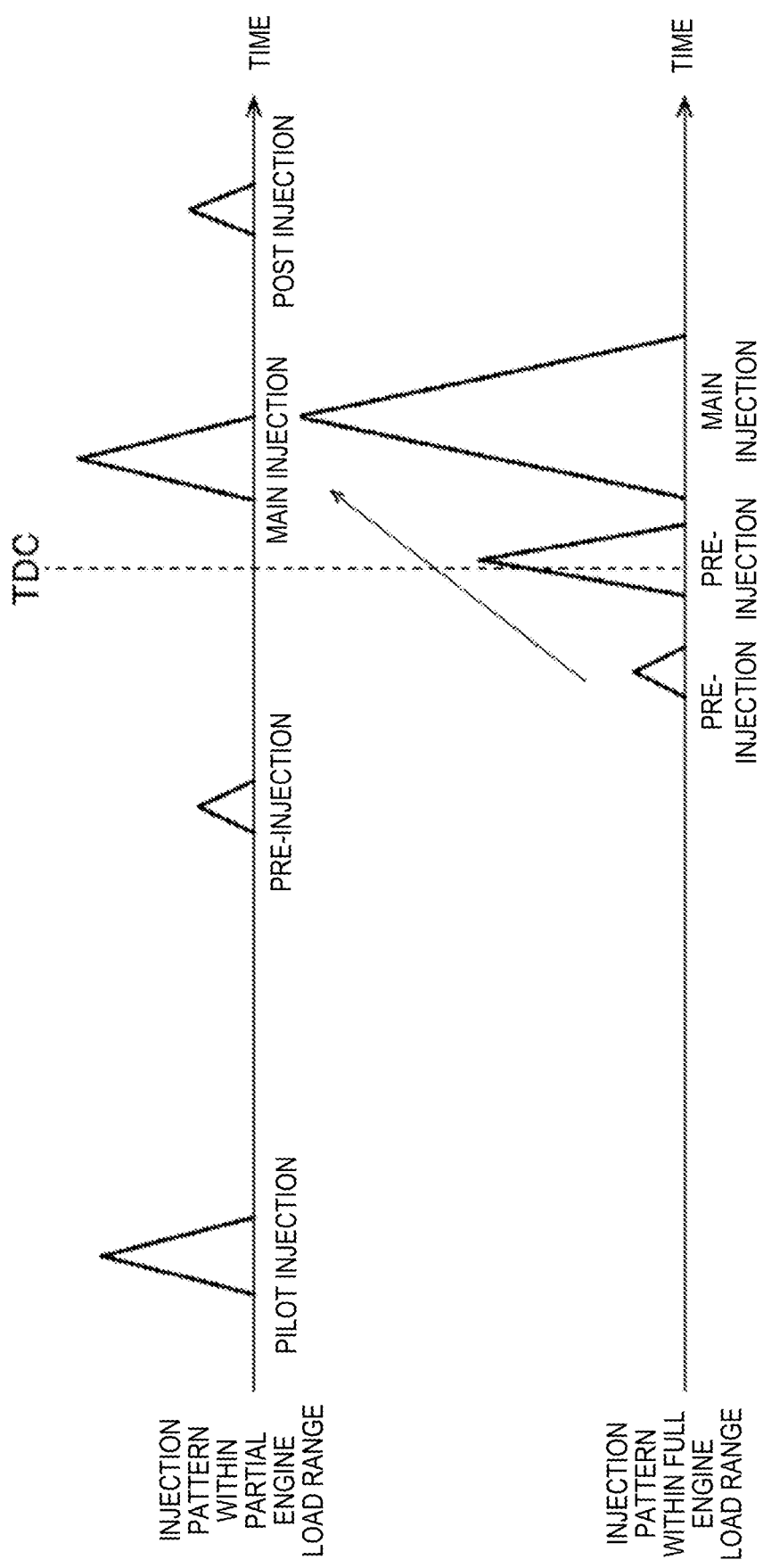
FIG. 9 is a schematic view illustrating an example of fuel injection patterns within the partial engine load range and the full engine load range.

FIG. 9 schematically illustrates an example of fuel injection patterns within the partial engine load range and the full engine load range. In the example illustrated in FIG. 9, the pilot injection, the pre-injection, the main injection, and the post injection are performed within the partial engine load range, and two pre-injections and the main injection are performed within the full engine load range. More specifically, within the partial engine load range, the plurality of fuel injections are performed at relatively long time intervals. This is to secure the time for using a swirl flow and penetration of the fuel injection within the combustion chamber so as to enhance the mixing of the fuel and air inside the combustion chamber. On the other hand, within the full engine load range, the plurality of fuel injections are performed at relatively short time intervals. This is because, within the full engine load range, the environment where the mixing of the fuel and air within the combustion chamber is sufficiently secured is obtained and there is no need to use the swirl flow or the penetration as in the partial engine load range. Especially within the full engine load range, while performing the plurality of fuel injections at close timings, the injection amount is increased stepwise over the plurality of fuel injections (hereinafter, suitably referred to as "slope injections").

Thus, within the partial engine load range, the ignition delaying period is considered to be long since the injection intervals of the plurality of the fuel injections are long, whereas, within the full engine load range, the ignition delaying period is considered to be short since the injection intervals of the plurality of the fuel injections are short. Therefore, the present inventors considered to increase the number of fuel injections within the partial engine load range, to shorten the ignition intervals and thus shorten the ignition delaying period.

Figure 10:
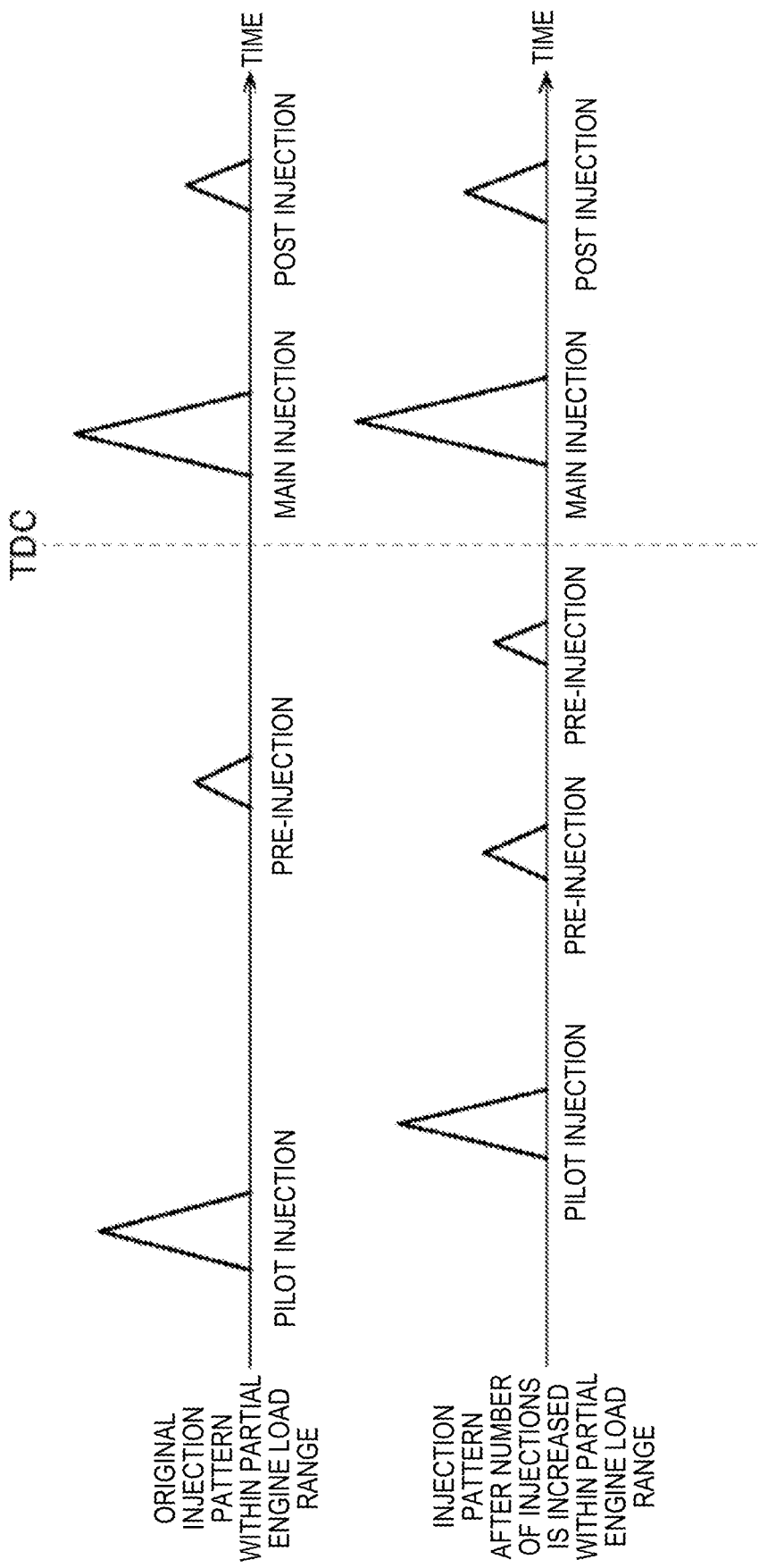
FIG. 10 is a schematic view illustrating an example of a fuel injection pattern in which the number of injections is increased within the partial engine load range.

FIG. 10 schematically illustrates an example of fuel injection patterns in which the number of injections is increased within the partial engine load range. As illustrated in the lower part of FIG. 10, within the partial engine load range, the number of pre-injections is increased by one, that is, the pre-injections are performed twice.

Figure 11A:
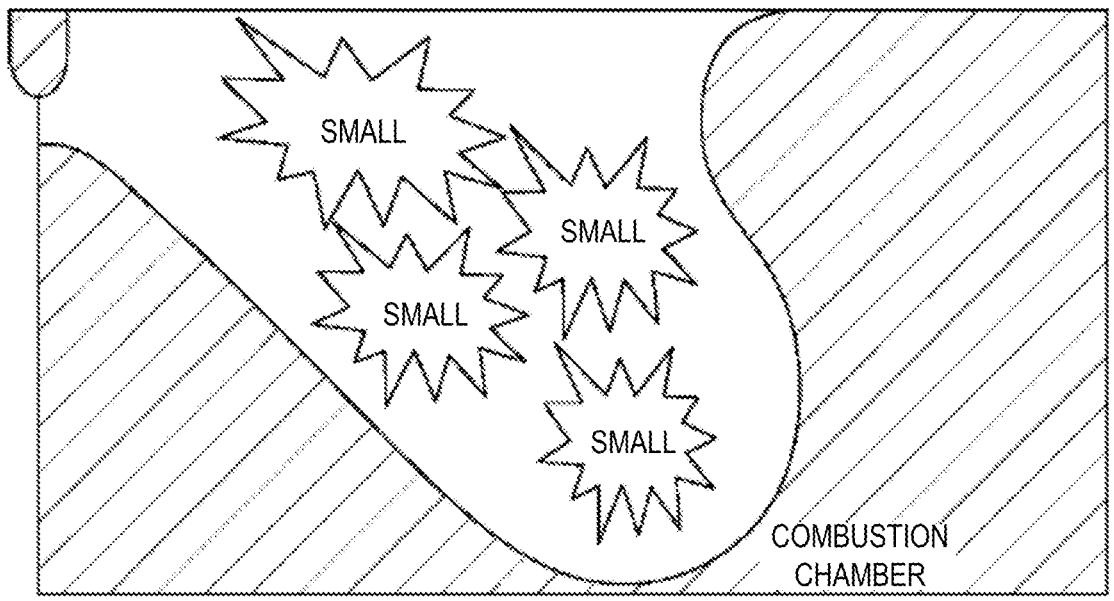
FIGS. 11A and 11B are conceptual views illustrating combustion when the number of injections is increased within the partial engine load range.
Figure 11B:
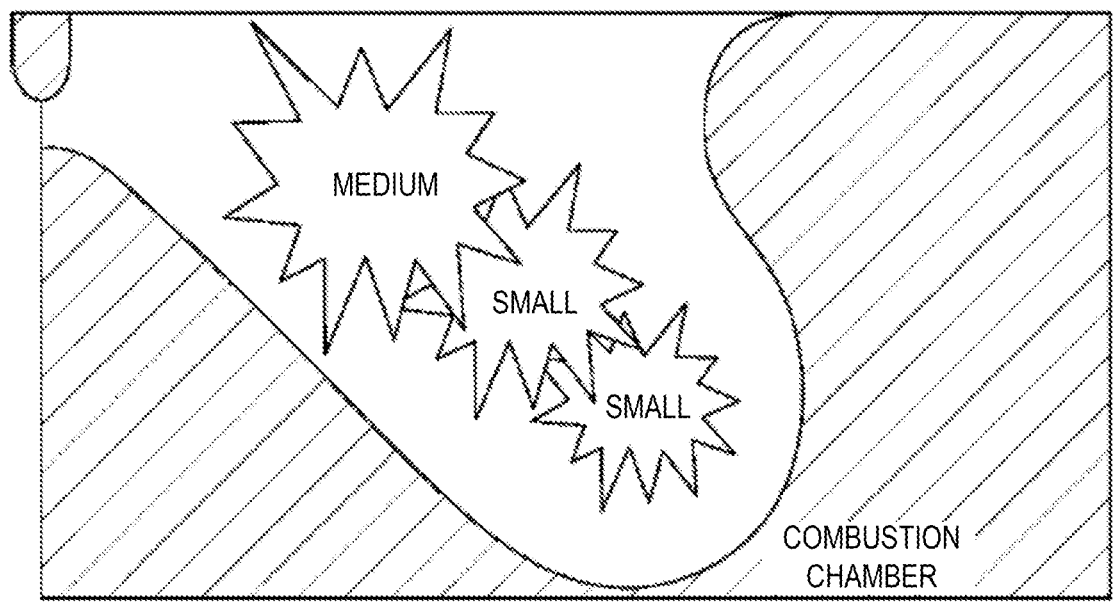

FIGS. 11A and 11B are conceptual views illustrating combustion when the number of injections is increased within the partial engine load range. FIG. 11A illustrates a combustion model inside the combustion chamber when the number of injections is increased within the partial engine load range, and FIG. 11B illustrates a combustion model inside the combustion chamber within the full engine load range. As illustrated in FIG. 11B, within the full engine load range, since the injection amount is increased stepwise, the scale of combustion (energy) continuously increases in the combustion chamber. On the other hand, when the number of injections is increased within the partial engine load range as illustrated in FIG. 11A, small scale combustions (energy) spread in the combustion chamber and the ignitions are performed in sequence. That is, also within the partial engine load range, by increasing the number of injections, similar combustion to that within the full engine load range is formed. Thus, within the partial engine load range, the ignition delaying period is shortened.

Figure 12A:
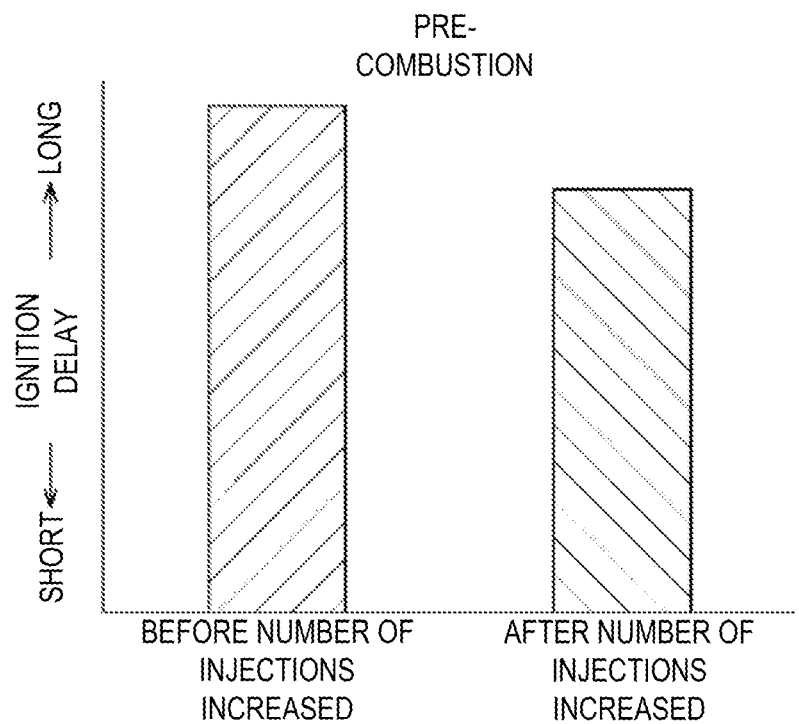
FIGS. 12A and 12B are charts illustrating an ignition delaying period when the number of injections is increased within the partial engine load range.
Figure 12B:
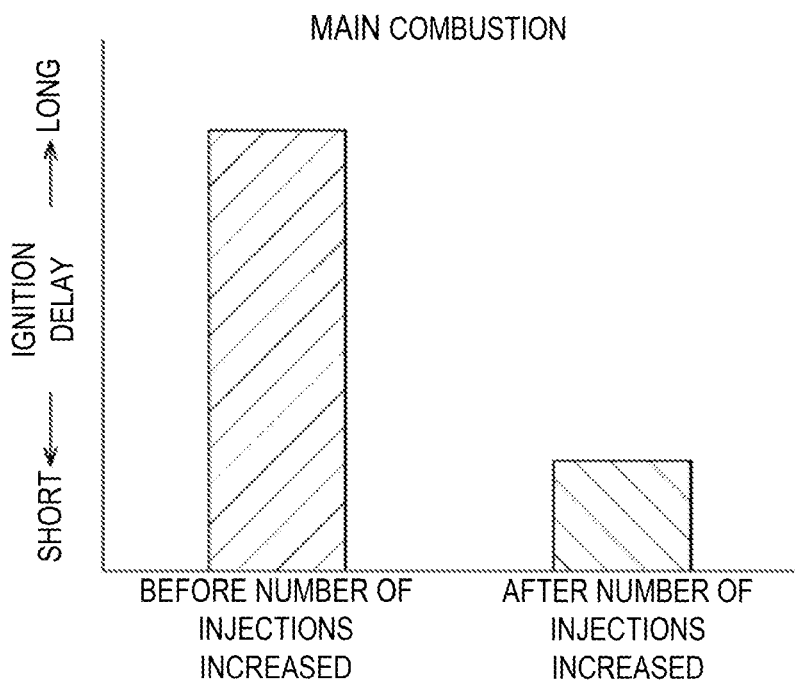

FIGS. 12A and 12B illustrate the ignition delaying period when the number of injections is increased within the partial engine load range. For example, FIG. 12A illustrates ignition delaying periods before and after the number of injections for the pre-combustion is increased, and FIG. 12B illustrates ignition delaying periods before and after the number of injections for the main combustion is increased. It can be understood from FIGS. 12A and 12B that, by increasing the number of injections within the partial engine load range, the ignition delaying periods of both the pre-combustion and the main combustion (especially the main combustion) become shorter.

Therefore, in order to shorten the ignition delaying period within the partial engine load range, the present inventors conducted with desk-study calibration of a fuel injection pattern combined the increase of the number of injections and the slope injections. Here, a highest number of injections applied to the fuel injection pattern was set to seven times including, for example, three pilot injections, two pre-injections, one main injection, and one post injection.

Moreover, the injection amounts of the respective fuel injections were also suitably changed.

Figure 13:
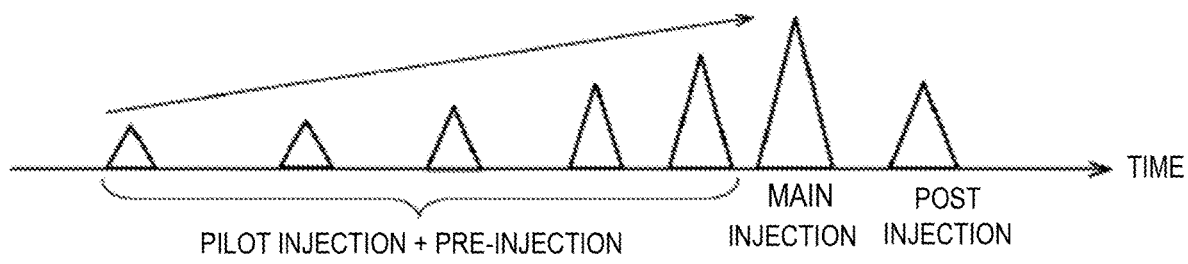
FIG. 13 is a schematic view illustrating an example of a fuel injection pattern applied within the partial engine load range.

FIG. 13 schematically illustrates an example of the fuel injection pattern applied within the partial engine load range. In FIG. 13, in order to shorten the ignition delaying period within the partial engine load range, the example of the fuel injection pattern in which the seven fuel injections are performed and the injection amount is increased stepwise (that is, the slope injections are performed) is given. Hereinafter, the fuel injection pattern as illustrated in FIG. 13 is suitably referred to as "reference seven-stage injection pattern."

Figure 14:
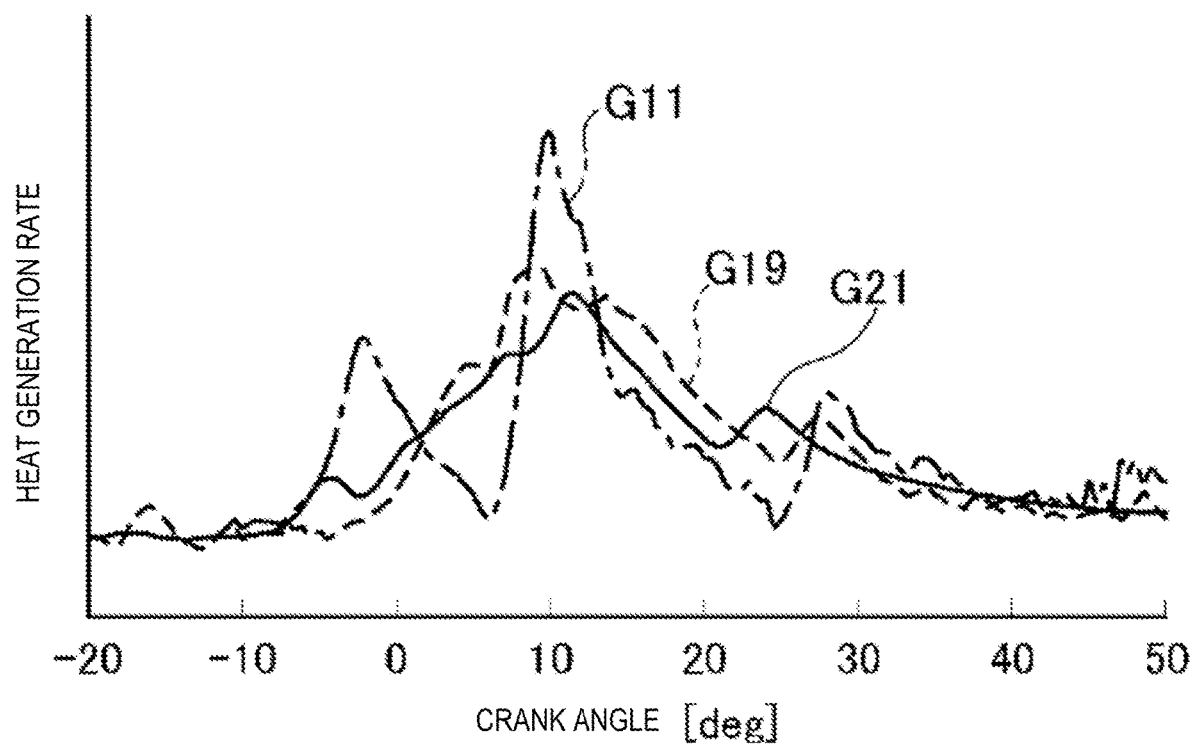
FIG. 14 is a chart illustrating a combustion waveform when a reference seven-stage injection pattern is applied.

FIG. 14 illustrates a combustion waveform when the reference seven-stage injection pattern is applied, in which a horizontal axis indicates the crank angle and a vertical axis indicates the heat generation rate. For example, the graphs G11 and G19 are the same as those in FIGS. 4A and 7A. In other words, the graph G11 indicates the combustion waveform achieved by the original fuel injection pattern within the partial engine load range, in which the increased number of injections and the slope injections are not applied (hereinafter, referred to as "reference injection pattern"). Moreover, the graph G19 indicates the target combustion waveform based on the combustion waveform having the lowest slope of heat generation (see the graph G17 of FIG. 6A). On the other hand, a graph G21 indicates the combustion waveform when the reference seven-stage injection pattern is applied. It can be understood from this graph G21 that the target combustion waveform is substantially achieved by applying the reference seven-stage injection pattern.

Figure 15A:
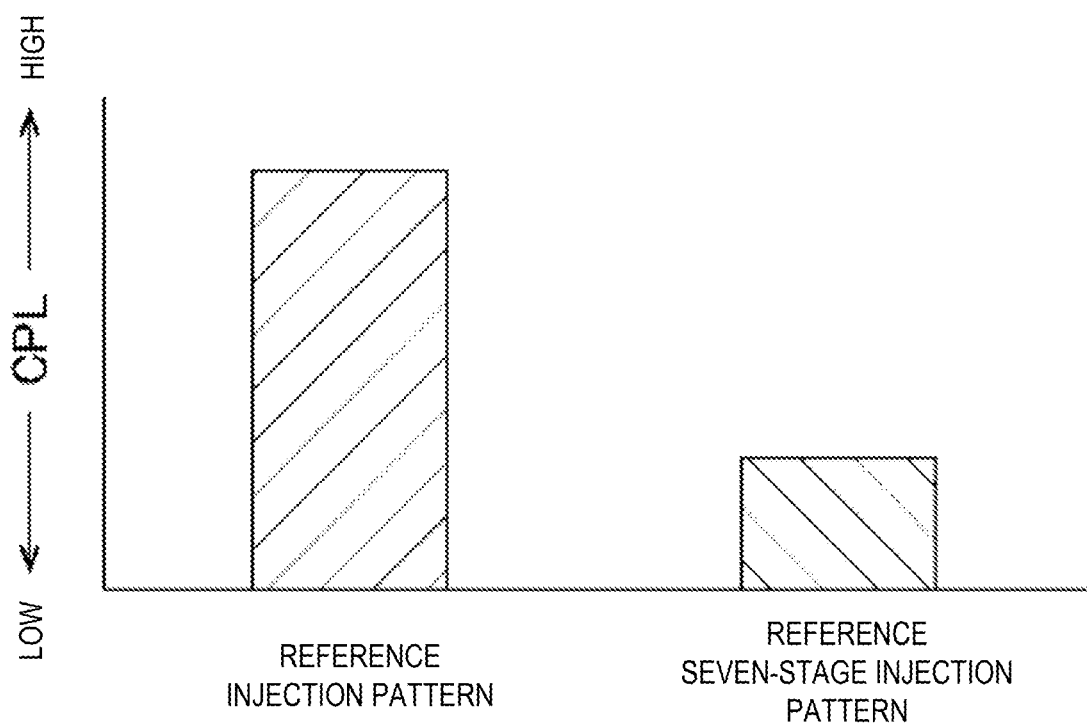
FIGS. 15A and 15B are charts illustrating a CPL and a smoke amount when the reference seven-stage injection pattern is applied.
Figure 15B:
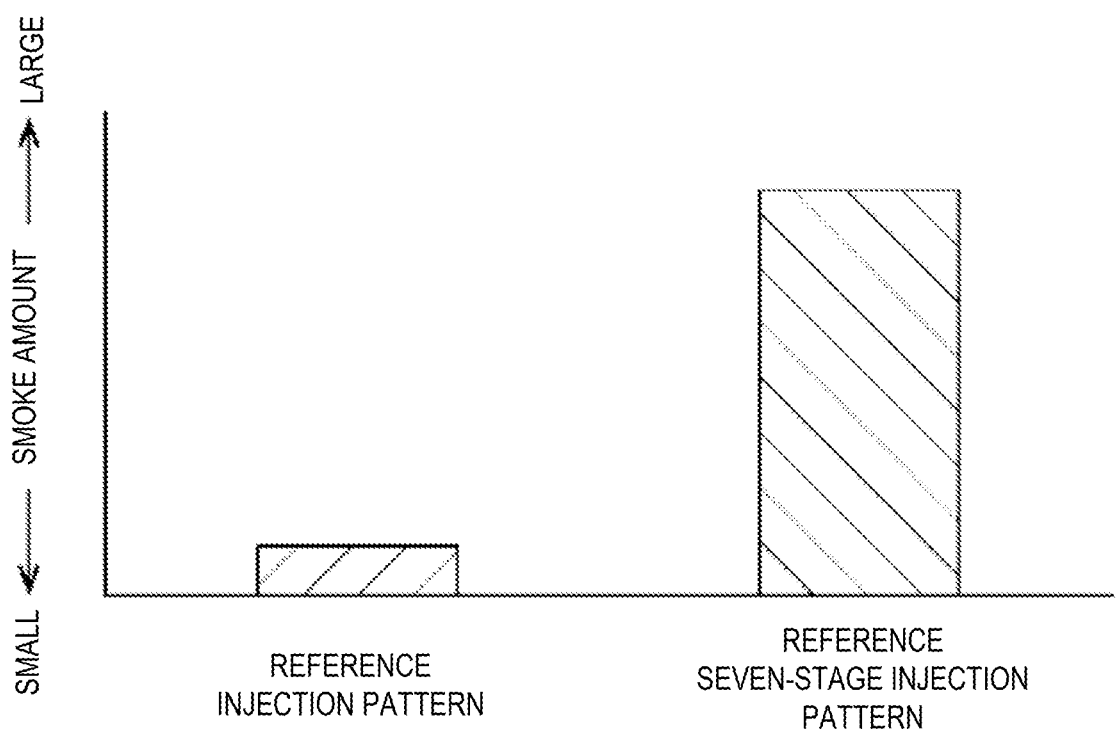

FIGS. 15A and 15B illustrate the CPL and the smoke amount when the reference seven-stage injection pattern is applied. For example, FIG. 15A illustrates the CPL when the reference injection pattern and the reference seven-stage injection pattern are applied. It can be understood from FIG. 15A that the CPL is significantly improved when the reference seven-stage injection pattern is applied compared to when the reference injection pattern is applied. On the other hand, FIG. 15B illustrates the smoke amount when the reference injection pattern and the reference seven-stage injection pattern are applied. It can be understood from FIG. 15B that the smoke amount is larger when the reference seven-stage injection pattern is applied compared to when the reference injection pattern is applied. Therefore, the present inventors considered to improve the smoke amount by such a reference seven-stage injection pattern.

Figure 16A:
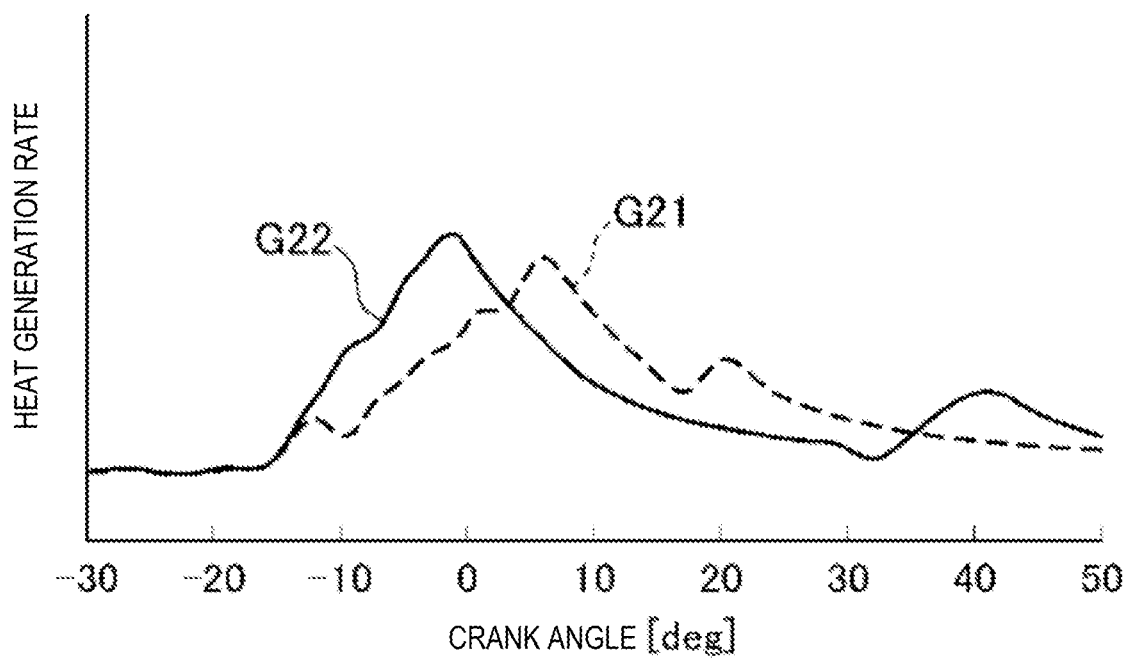
FIGS. 16A and 16B are charts illustrating combustion waveforms when first and second improved seven-stage injection patterns are applied.
Figure 16B:
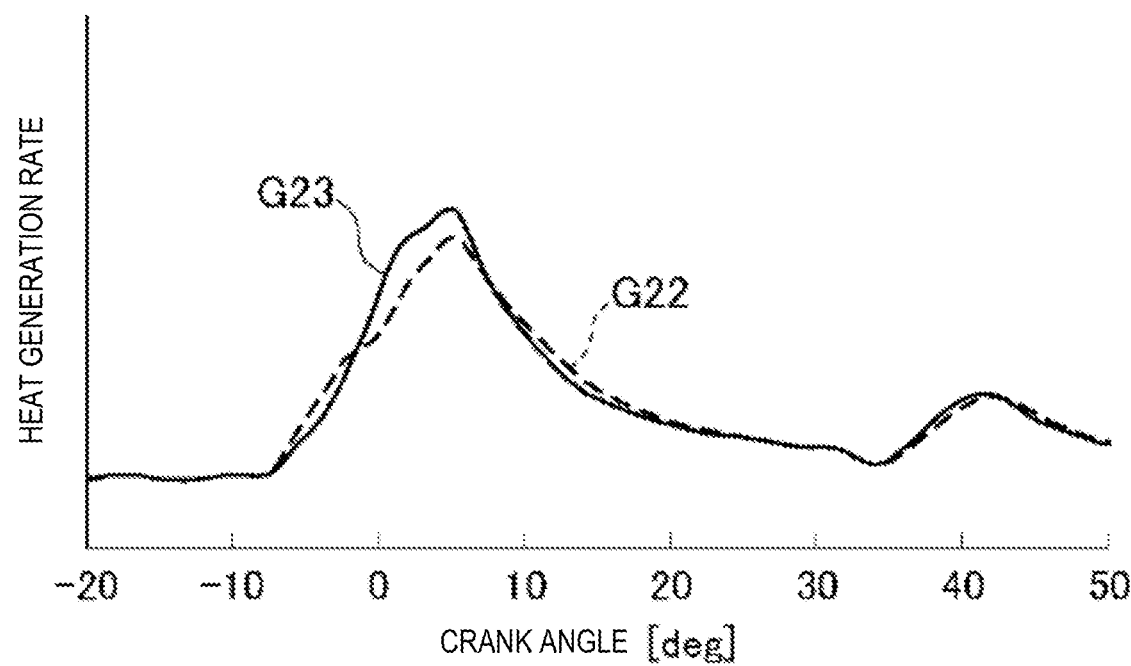

FIGS. 16A and 16B illustrate combustion waveforms when first and second improved seven-stage injection patterns designed by improving the reference seven-stage injection pattern are applied. In FIGS. 16A and 16B, a horizontal axis indicates the crank angle and a vertical axis indicates the heat generation rate.

For example, in FIG. 16A, the graph G21 is the same as that of FIG. 14, that is, it indicates the combustion waveform when the reference seven-stage injection pattern is applied, and a graph G22 indicates a combustion waveform when the first improved seven-stage injection pattern is applied. In this first improved seven-stage injection pattern, compared to the reference seven-stage injection pattern, the dent (valley) in the rise portion of the combustion waveform is eliminated to smoothen the rise of the combustion waveform (stabilize the slope), the peak of the combustion waveform is advanced, and the heat generation amount in the rise portion of the combustion waveform corresponding to the main combustion is reduced. The smoke amount is aimed to be reduced by such a first improved seven-stage injection pattern. Note that the dent (valley) in the rise portion of the combustion waveform becomes, because the rise for resuming from this dent is sharp, an impact noise which becomes a major factor of the knocking sound, particularly containing many high-frequency components.

Further, in the first improved seven-stage injection pattern, by retarding the post injection from that of the reference seven-stage injection pattern so as to reduce the smoke amount more, the mixing period of the fuel and air is extended. Note that the combustion waveform is advanced in the first improved seven-stage injection pattern as described above so as to prevent torque down (fuel consumption increase) caused by retarding the post injection.

On the other hand, in FIG. 16B, the graph G22 is the same graph as that of FIG. 16A, that is, it indicates the combustion waveform when the first improved seven-stage injection pattern is applied, and a graph G23 indicates a combustion waveform when the second improved seven-stage injection pattern is applied. The second improved seven-stage injection pattern is basically the same pattern as the first improved seven-stage injection pattern except that the injection pressure of fuel is increased. By such an increase of the injection pressure of the fuel, the homogenization of the fuel is improved to reduce the smoke amount.

Figure 17A:
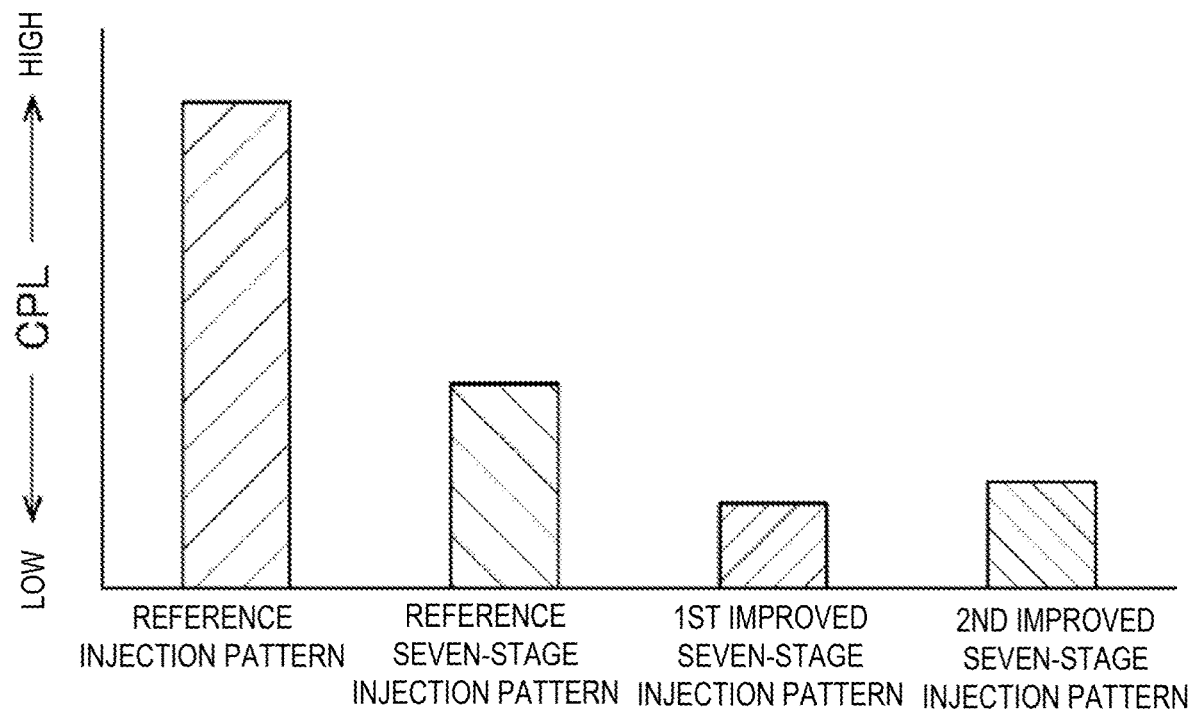
FIGS. 17A and 17B are charts illustrating a CPL and a smoke amount when the first and second improved seven-stage injection patterns are applied.
Figure 17B:
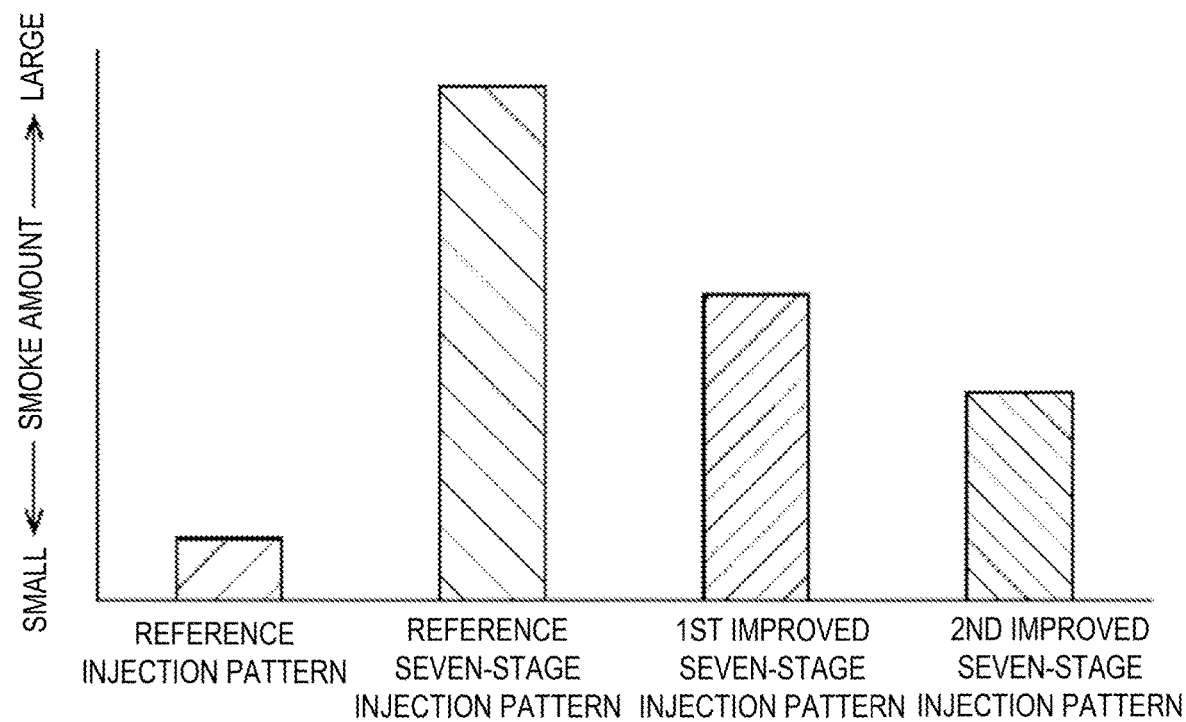

FIGS. 17A and 17B illustrate the CPL and the smoke amount when the first and second improved seven-stage injection patterns are applied. For example, FIG. 17A illustrates the CPL when the reference injection pattern, the reference seven-stage injection pattern, and the first and second improved seven-stage injection patterns are applied. It can be understood from FIG. 17A that the CPL is improved more when the first and second improved seven-stage injection patterns are applied compared to when the reference seven-stage injection pattern is applied. On the other hand, FIG. 17B illustrates the smoke amount when the reference injection pattern, the reference seven-stage injection pattern, and the first and second improved seven-stage injection patterns are applied. It can be understood from FIG. 17B that the smoke amount is reduced when the first and second improved seven-stage injection patterns are applied compared to when the reference seven-stage injection pattern is applied, but it is still larger compared to when the reference injection pattern is applied. Thus, the present inventors came to a conclusion that it is difficult to reduce the smoke amount any more by simply improving the post injection and the injection pressure in the first and second improved seven-stage injection patterns. Therefore, the present inventors decided to examine factors for determining the CPL and the smoke amount in the multi-stage injections.

Figure 18A:
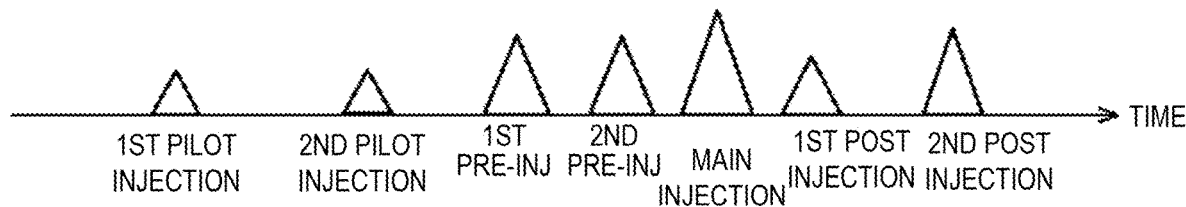
FIGS. 18A and 18B are views illustrating a sensitivity adjusting method of multi-stage injections, implemented to uncover mechanisms of the CPL and the smoke amount.
Figure 18B:
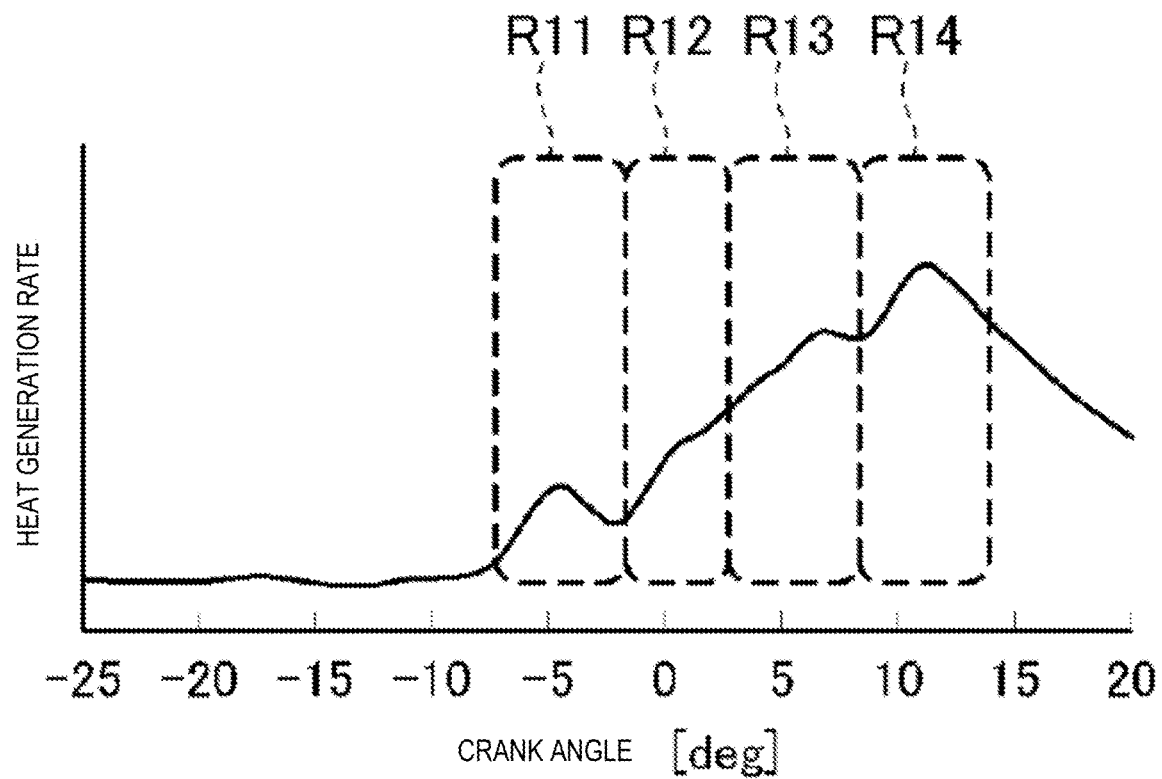

FIGS. 18A and 18B are views illustrating a sensitivity adjusting method of the multi-stage injections, implemented to uncover the mechanisms of the CPL and the smoke amount. FIG. 18A illustrates an example of a fuel injection pattern applied for uncovering the mechanisms. This fuel injection pattern includes seven injections including a first pilot injection, a second pilot injection, a first pre-injection, a second pre-injection, a main injection, a first post injection, and a second post injection. FIG. 18B illustrates an example of a combustion waveform when a fuel injection pattern of FIG. 18A is applied. In this combustion waveform, a range R11 corresponds to combustion caused by the first and second pilot injections, a range R12 corresponds to combustion caused by the first pre-injection, a range R13 corresponds to combustion caused by the second pre-injection, and a range R14 corresponds to combustion caused by the main injection and the first post injection.

Here, the present inventors examined the heat generation and smoke sensitivity in relation to the injection amount for each of the multi-stage injections to uncover the function to be equipped for each of the multi-stage injections. For this examination, the slope of the heat generation rate highly correlated with the CPL is converted into a vertical change of the heat generation amount per unit injection amount to substitute the heat generation amount for the knocking sound.

Figure 19A:
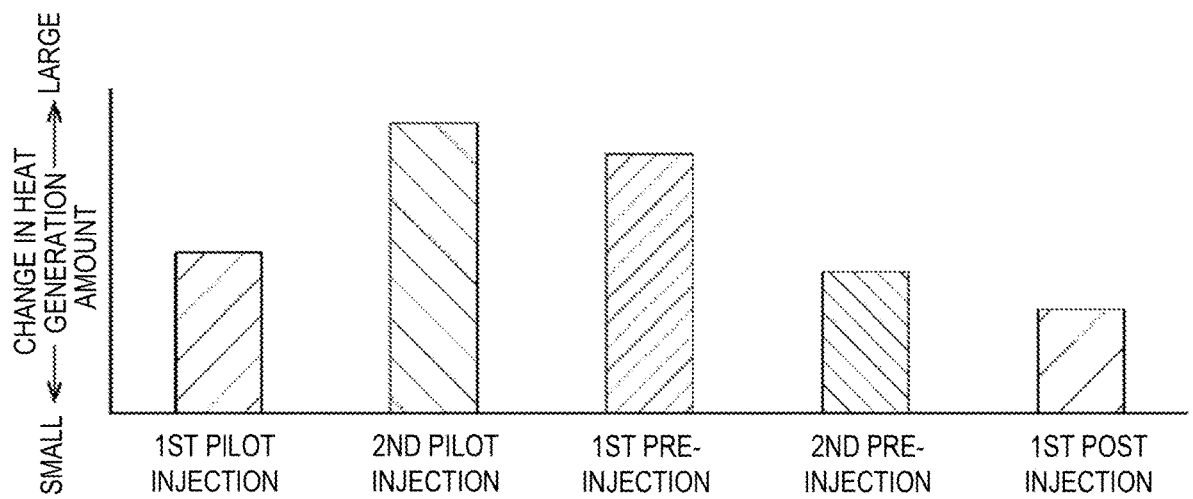
FIGS. 19A and 19B are charts illustrating a sensitivity examination result of each of the multi-stage injections within the partial engine load range.
Figure 19B:
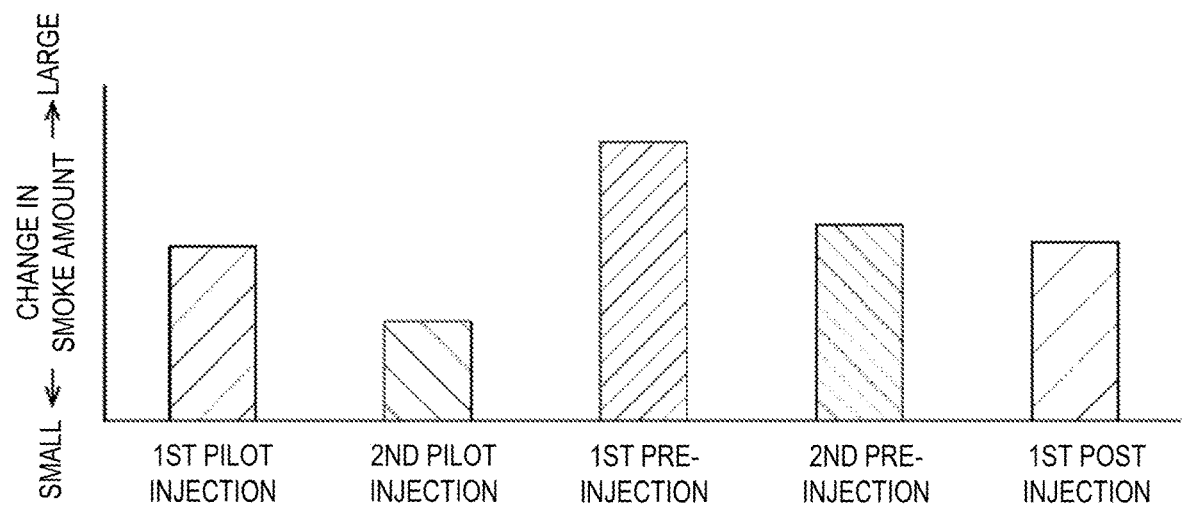

FIGS. 19A and 19B illustrate a sensitivity examination result of each of the multi-stage injections within the partial engine load range. For example, FIG. 19A illustrates the vertical change of the heat generation amount per unit injection amount, for the first and second pilot injections, the first and second pre-injections, and the first post injection. The vertical change of the heat generation amount uniquely indicates the knocking sound (CPL). It can be understood from FIG. 19A that the vertical change of the heat generation amount is large regarding the second pilot injection and the first pre-injection. In other words, it can be understood that the second pilot injection and the first pre-injection cause a larger influence on the knocking sound (CPL) compared to the other fuel injections. On the other hand, FIG. 19B illustrates the change in the smoke amount per unit injection amount, for the first and second pilot injections, the first and second pre-injections, and the first post injection. It can be understood from FIG. 19B that the change in the smoke amount is large regarding the first and second pre-injections and the first post injection. In other words, it can be understood that the first and second pre-injections and the first post injection cause a larger influence on the smoke amount compared to the other fuel injections.

Based on the examination results illustrated in FIGS. 19A and 19B, mechanisms of the CPL and the smoke amount in which the magnitude of the CPL depends on a preceding-stage fuel injection and the magnitude of the smoke amount depends on a subsequent-stage fuel injection were found. Therefore, based on the mechanisms, the present inventors performed the calibration of the fuel injection pattern by adjusting the preceding-stage fuel injection to reduce the CPL and by adjusting the subsequent-stage fuel injection to reduce the smoke amount.

Figure 20:
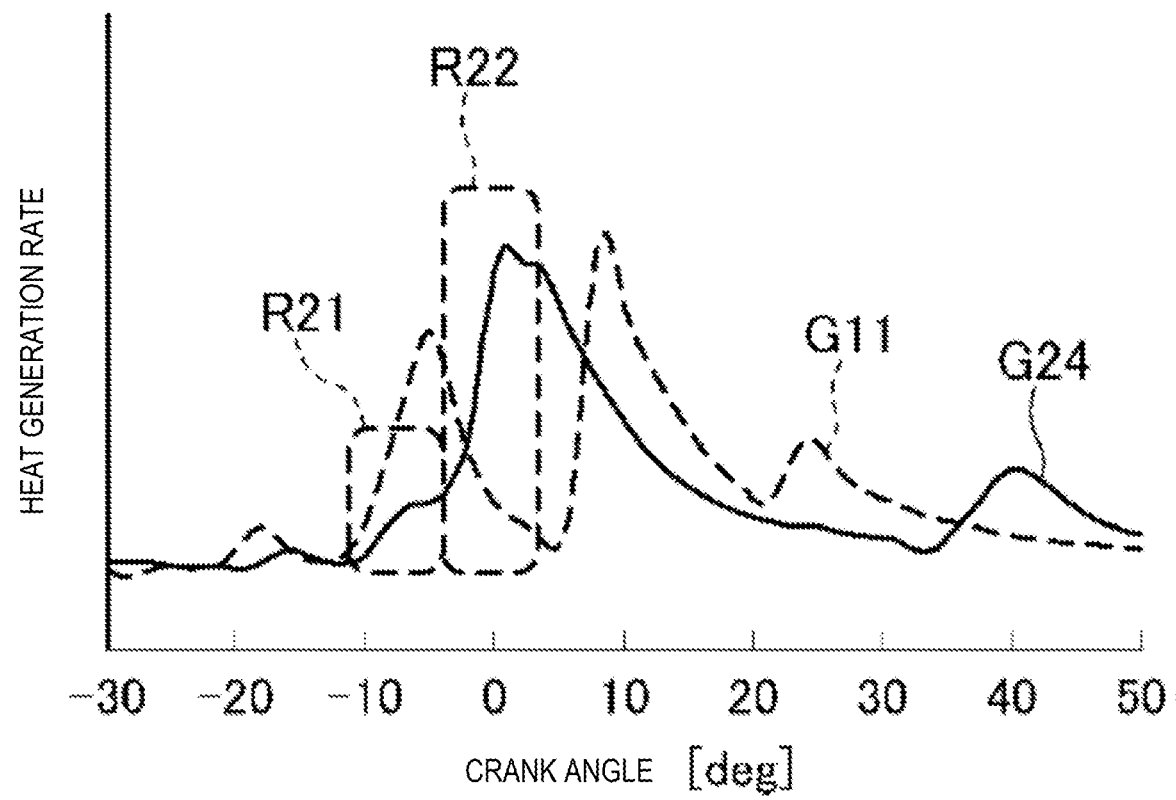
FIG. 20 is a chart illustrating a combustion waveform in a fuel injection pattern obtained by calibration based on the mechanisms of the CPL and the smoke amount.

FIG. 20 illustrates a combustion waveform in the fuel injection pattern obtained by the calibration based on the mechanisms of the CPL and the smoke amount as described above, in which a horizontal axis indicates the crank angle and a vertical axis indicates the heat generation rate. For example, the graph G11 is the same as that of FIG. 4A, that is, it indicates the combustion waveform obtained from the reference injection pattern, and a graph G24 indicates a combustion waveform in the fuel injection pattern within the partial engine load range, obtained by the calibration based on the mechanisms of the CPL and the smoke amount. The latter fuel injection pattern includes six fuel injections, which is suitably referred to as "improved six-stage injection pattern" below. This improved six-stage injection pattern basically is the seven-stage injection pattern described above (the reference seven-stage injection pattern, the first and second improved seven-stage injection patterns) but without the first fuel injection.

For example, in the improved six-stage injection pattern, the pre-combustion is included in the main combustion to eliminate the dent (valley) of the rise portion of the combustion waveform and make the rise of the combustion waveform less steep (see a range R21). Thus, the CPL is reduced. Especially the high frequency component of the knocking sound is reduced. Moreover, in the improved six-stage injection pattern, the combustion waveform corresponding to the main combustion is made into a trapezoid by the multi-stage injections (see a range R22) so that the smoke amount is reduced. Additionally, in the improved six-stage injection pattern, the post injection is retarded to further reduce the smoke amount. In this case, to avoid the torque down (fuel consumption increase) caused by the retarding of the post injection, the main combustion is advanced in the improved six-stage injection pattern.

Figure 21A:
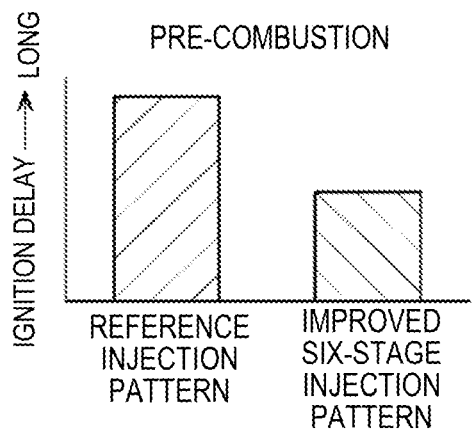
FIGS. 21A to 21F are charts illustrating various results when an improved six-stage injection pattern is applied within the partial engine load range.
Figure 21B:
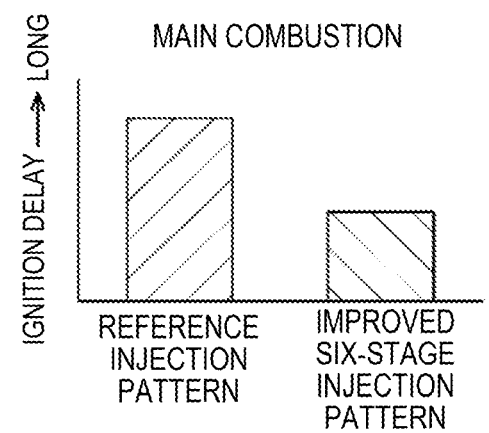

FIGS. 21A to 21F illustrate various results when the improved six-stage injection pattern is applied within the partial engine load range. First, FIGS. 21A and 21B illustrate ignition delaying periods in the pre-combustion and the main combustion, respectively, when the reference injection pattern and the improved six-stage injection pattern are applied. It can be understood from FIGS. 21A and 21B that when the improved six-stage injection pattern is applied, the ignition delaying periods of the pre-combustion and the main combustion both become shorter compared to when the reference injection pattern is applied.

Figure 21C:
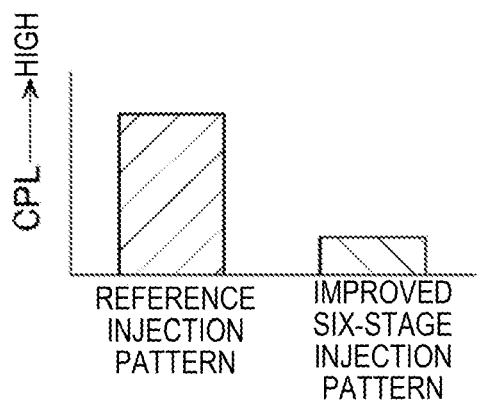

Next, FIG. 21C illustrates the CPL when the reference injection pattern and the improved six-stage injection pattern are applied. It can be understood from FIG. 21C that the CPL becomes smaller (e.g., about 6 dB smaller) when the improved six-stage injection pattern is applied compared to when the reference injection pattern is applied.

Figure 21D:
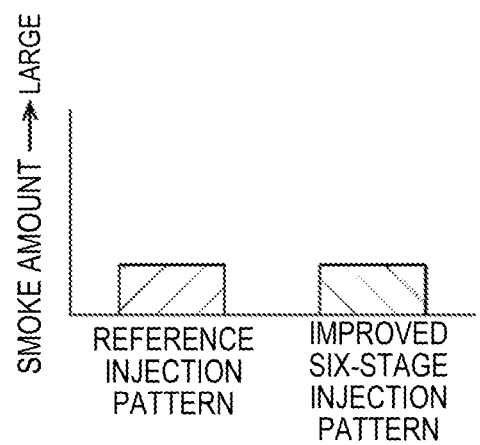

Next, FIG. 21D illustrates the smoke amount when the reference injection pattern and the improved six-stage injection pattern are applied. It can be understood from FIG. 21D that the smoke amount is the same between the case where the improved six-stage injection pattern is applied and the case where the reference injection pattern is applied. This means that, when the improved six-stage injection pattern is applied, the smoke amount is reduced compared to when the reference seven-stage injection pattern and the first and second improved seven-stage injection patterns described above are applied.

Figure 21E:
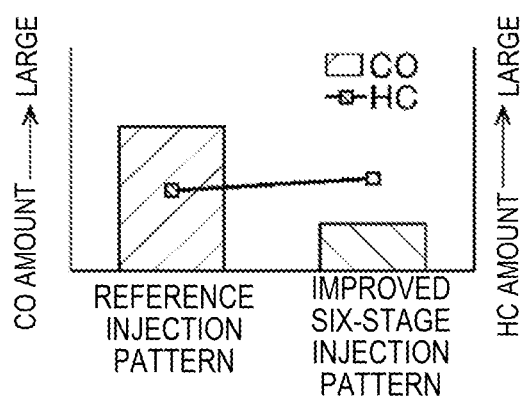

Next, FIG. 21E illustrates a CO amount and an HC amount when the reference injection pattern and the improved six-stage injection pattern are applied. It can be understood from FIG. 21E that, when the improved six-stage injection pattern is applied, the CO amount becomes smaller (e.g., about 20% reduced) while the HC amount remains the same compared to when the reference injection pattern is applied. This is considered to be because the fuel attached inside the cylinder (unburned fuel) decreases when the improved six-stage injection pattern is applied.

Figure 21F:
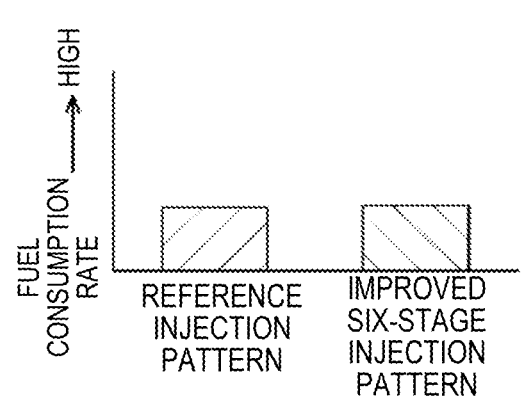

Next, FIG. 21F illustrates a fuel consumption rate when the reference injection pattern and the improved six-stage injection pattern are applied. It can be understood from FIG. 21F that the fuel consumption rate is the same between the case where the improved six-stage injection pattern is applied and the case where the reference injection pattern is applied.

From above, according to the improved six-stage injection pattern, within the partial engine load range, the knocking sound is significantly reduced without degrading the emission performance, such as smoke, or increasing the fuel consumption.

<Control of this Embodiment>

Next, a control according to this embodiment of the present disclosure based on the basic concept described above will be specifically described.

Figure 22:
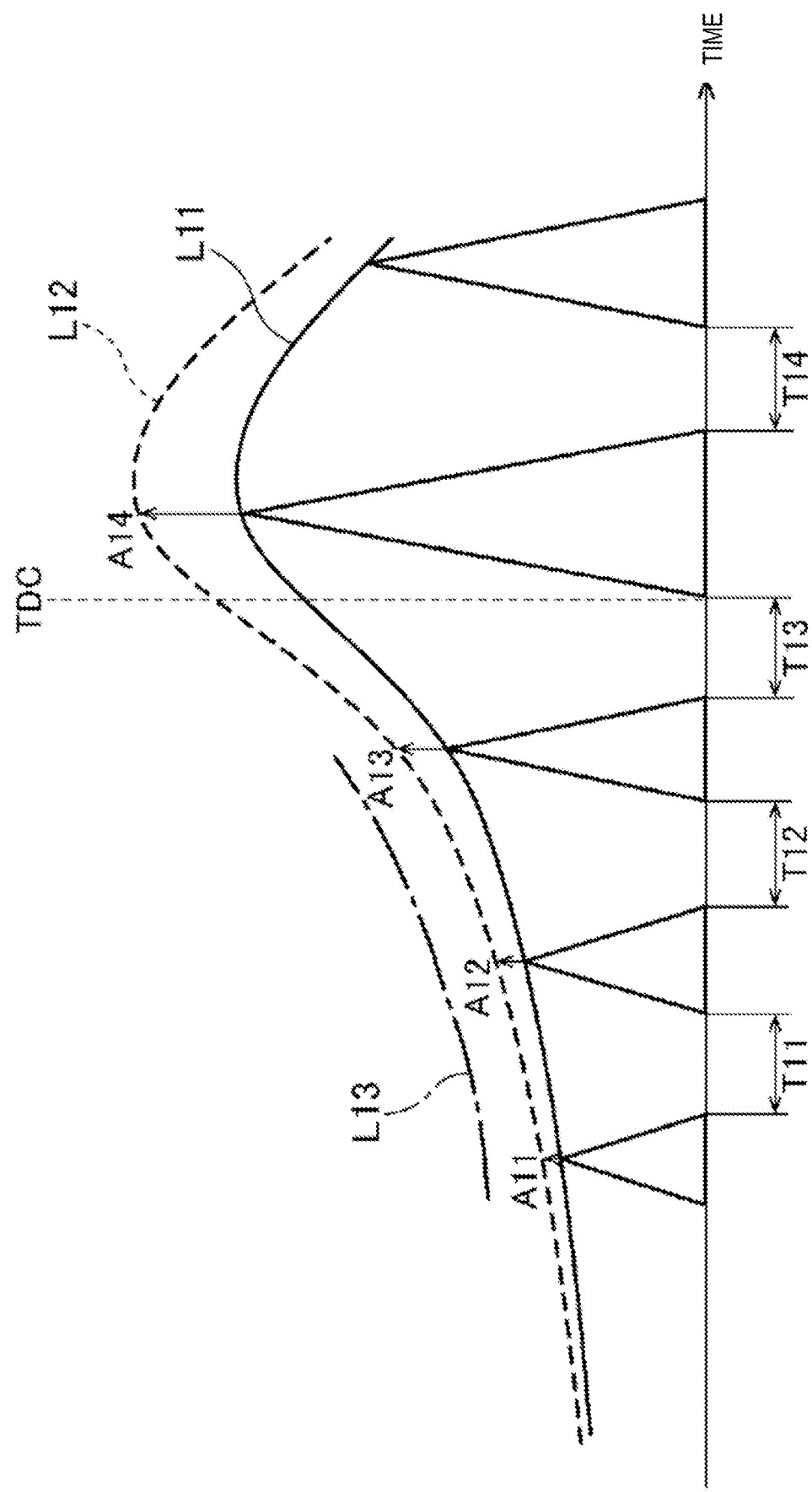
FIG. 22 is a chart illustrating a control performed by a PCM in the embodiment of the present disclosure.

FIG. 22 is a chart illustrating a control executed by the PCM 70 in this embodiment of the present disclosure. FIG. 22 schematically illustrates the plurality of fuel injections in which a horizontal direction indicates time (uniquely corresponds to the crank angle) and a vertical direction indicates the fuel injection amount. In this embodiment, within the partial engine load range as described above, the PCM 70 performs one main injection, three pre-stage injections prior to the main injection, and one later-stage injection after the main injection. The pre-stage injections at least include the pre-injection (may or may not include the pilot injection), and the later-stage injection is the post injection. Hereinafter, the three pre-stage injections are referred to as "first-stage injection," "second-stage injection," and "third-stage injection," respectively, the main injection is referred to as "fourth-stage injection," and the later-stage injection is referred to as "fifth-stage injection."

Particularly in this embodiment, as indicated by a solid line L11 of FIG. 22, the PCM 70 controls the fuel injection amounts applied to the first-stage injection, the second-stage injection, and the third-stage injection to be larger stepwise toward the main injection, i.e., performs the slope injections. Thus, the heat generation rate is continuously increased by the first-stage injection, the second-stage injection, and the third-stage injection, so as to raise the in-cylinder heat amount, thus in-cylinder pressure, at the start of the main combustion. In this manner, the slope of the in-cylinder pressure up to a highest in-cylinder pressure caused by the main combustion is made less steep, and the high-frequency component of the knocking sound is suitably reduced.

Moreover, in this embodiment, the PCM 70 sets injection intervals T11, T12, T13, and T14 between the first-stage injection, the second-stage injection, the third-stage injection, the fourth-stage injection, and the fifth-stage injection, respectively, to be substantially constant. By particularly setting the injection intervals T11, T12, and T13 to be substantially constant, heat is continuously generated toward the main injection by the first-stage injection, the second-stage injection, and the third-stage injection.

Note that as illustrated in FIG. 22, although the injection intervals T11, T12, and T13 are substantially constant in terms of time, they are not constant in terms of crank angle. For example, a width of the crank angle corresponding to the injection interval becomes narrower toward the later stage (retarding side), that is, "crank angle width corresponding to injection interval T11>crank angle width corresponding to the injection interval T12>crank angle width corresponding to injection interval T13." This is because the rotational speed of the crankshaft 7 defined by the crank angle decreases as approaching the TDC.

Figure 23:
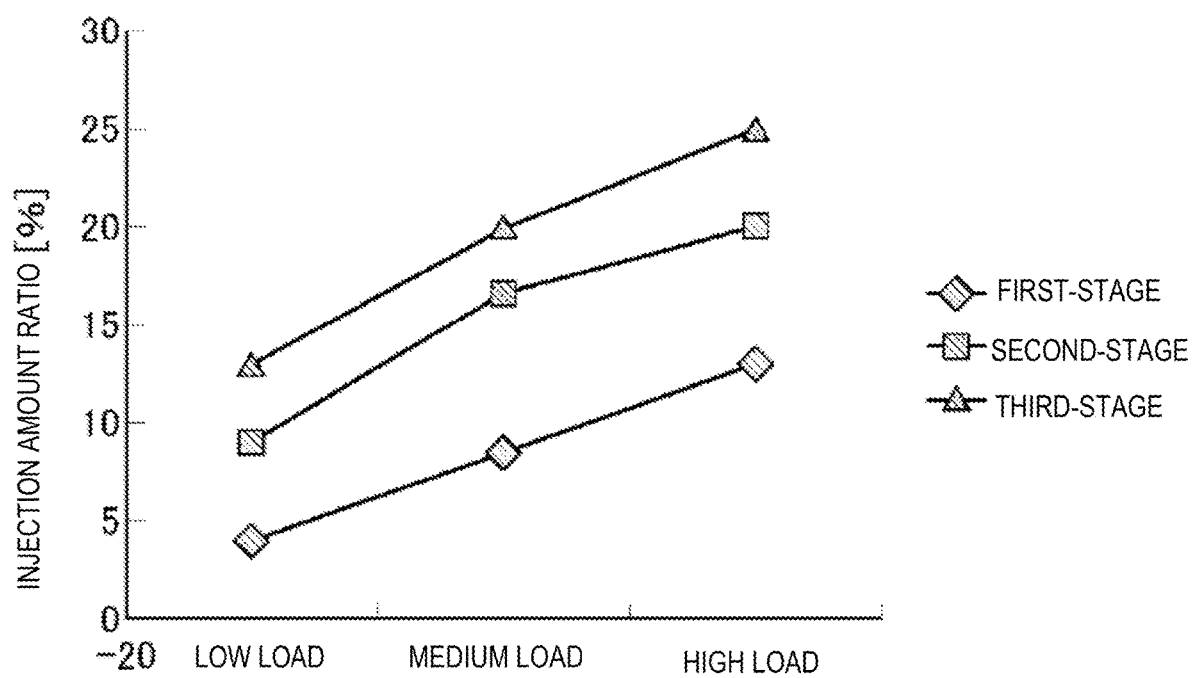
FIG. 23 is a chart illustrating a relationship between the engine load and a ratio of each injection amount with a total injection amount (injection amount ratio).

Further, in this embodiment, as indicated by a dashed line L12 and the arrows A11 to A14 of FIG. 22, the PCM 70 increases the fuel injection amount in each fuel injection according to an increase in the engine load. The increase in the fuel injection amount according to the engine load is described with reference to FIG. 23. FIG. 23 illustrates a relationship of the engine load with ratios of the fuel injection amounts of the first-stage injection, the second-stage injection, and the third-stage injection with respect to the total injection amount of the first- to fourth-stage injections. As illustrated in FIG. 23, the PCM 70 increases the ratios of the fuel injection amounts of the first- to third-stage injections with respect to the total injection amount according to the increase in the engine load. As the engine load increases, although the fuel injection amount of the main injection increases and the highest in-cylinder pressure caused by the main combustion rises, by increasing the ratios of the fuel injection amounts of the first- to third-stage injections according to the increase in the engine load, the slope of the in-cylinder pressure up to the thus-increased highest in-cylinder pressure is suitably made less steep.

Furthermore, the PCM 70 increases, as the fuel injection proceeds to the later stage (retarding side), an increase rate of the injection amount with respect to an increase of the total injection amount caused by the engine load increase. For example, the PCM 70 increases the increase rate of the second-stage injection amount with respect to the increase of the total injection amount (see the arrow A12 in FIG. 22) to be larger than the increase rate of the first-stage injection amount with respect to the increase of the total injection amount (see the arrow A11 in FIG. 22), and also sets the increase rate of the third-stage injection amount with respect to the increase of the total injection amount (see the arrow A13 in FIG. 22) to be larger than the increase rate of the second-stage injection amount with respect to the increase of the total injection amount (see the arrow A12 in FIG. 22). Thus, when the engine load increases, the injection amount of the injection close to the main injection is suitably increased to effectively increase the in-cylinder heat amount prior to the main combustion.

Figure 24A:
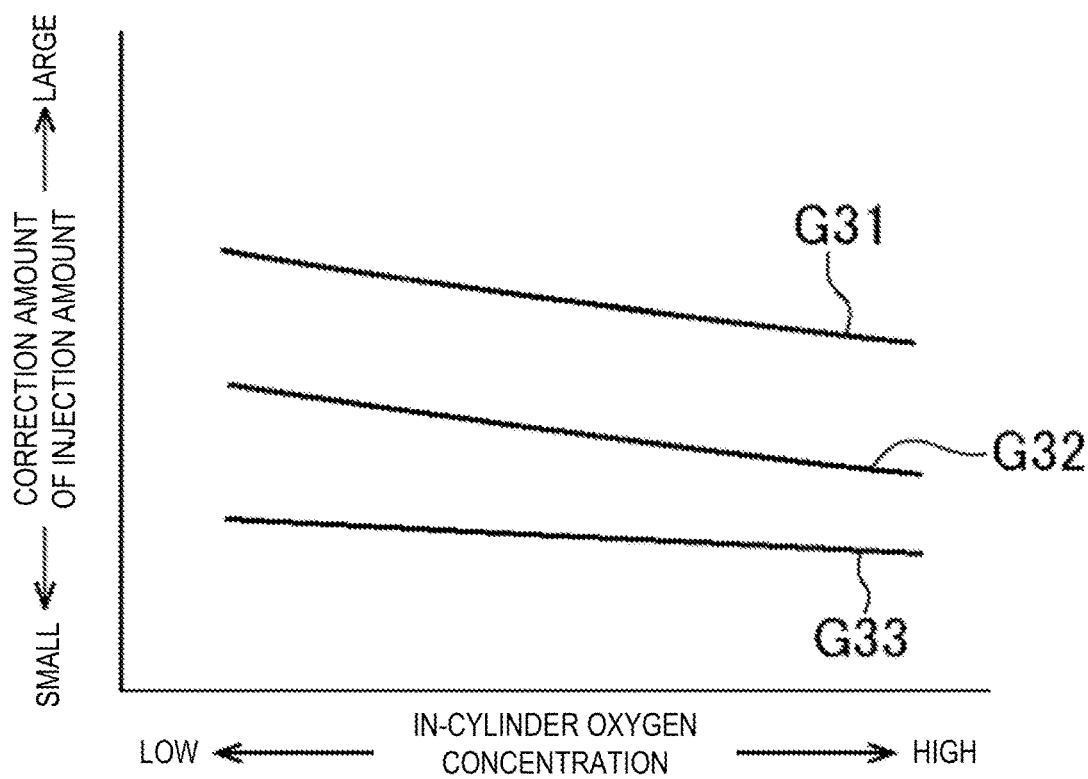
FIGS. 24A and 24B are charts illustrating relationships between an in-cylinder oxygen concentration and an injection amount correction coefficient.
Figure 24B:
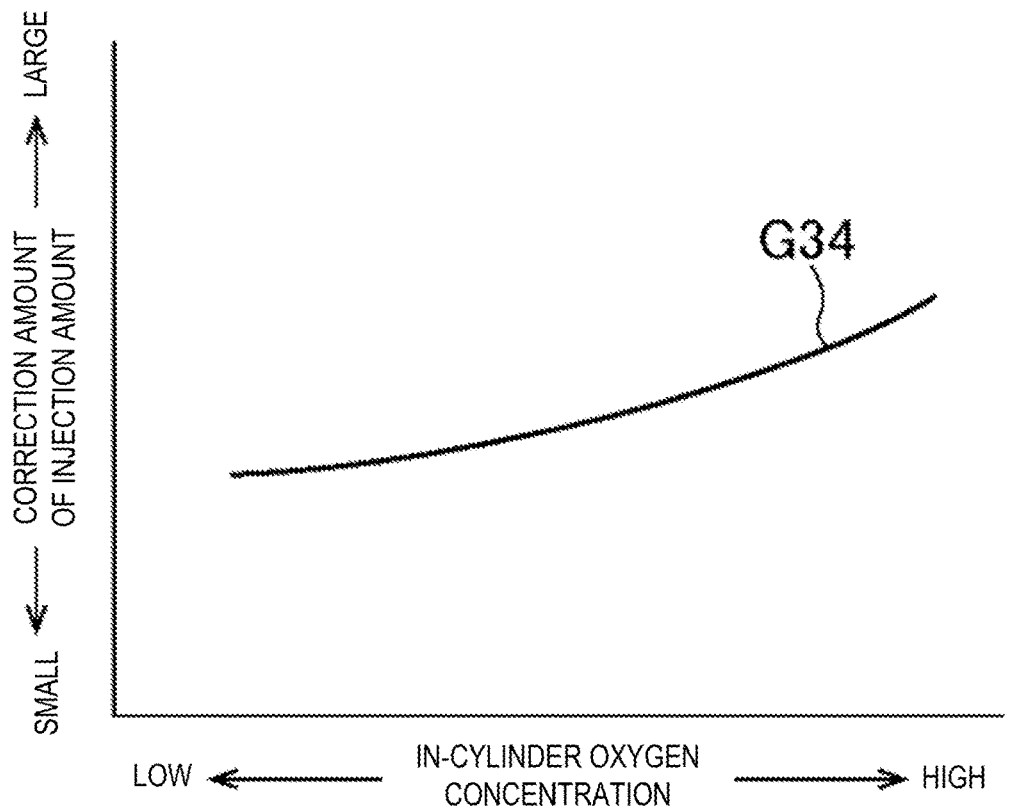

Furthermore, in this embodiment, as indicated by a one-dotted chain line L13 in FIG. 22, the PCM 70 increases the fuel injection amounts applied to the pre-stage injections when an in-cylinder oxygen concentration decreases. The setting of the fuel injection amounts according to the in-cylinder oxygen concentration is described with reference to FIGS. 24A and 24B. FIGS. 24A and 24B illustrate relationships between the in-cylinder oxygen concentration and a correction coefficient for correcting the fuel injection amounts (injection amount correction coefficient). For example, in FIG. 24A, a graph G31 indicates the injection amount correction coefficient applied to the first-stage injection, a graph G32 indicates the injection amount correction coefficient applied to the second-stage injection, and a graph G33 indicates the injection amount correction coefficient applied to the third-stage injection. Further, in FIG. 24B, a graph G34 indicates the injection amount correction coefficient applied to the fourth-stage injection (main injection). Note that in FIG. 24A, although the graphs G31 to G34 do not overlap for the sake of convenience, actually, these graphs G31 to G34 substantially overlap.

As illustrated in FIG. 24A, for each of the first- to third-stage injections (pre-stage injections), the PCM 70 increases the fuel injection amount by increasing the injection amount correction coefficient as the in-cylinder oxygen concentration decreases. In this manner, even if the ignition environment degrades due to the decrease in the in-cylinder oxygen concentration, by enhancing the penetration with the pre-stage injections with the increased fuel injection amounts, the oxidation reaction of the fuel inside the cylinder is stimulated and continuous combustions are reliably generated in the cylinder prior to the main injection. Thus, even if the ignition environment degrades due to the decrease in the in-cylinder oxygen concentration, the knocking sound is suitably reduced.

On the other hand, as illustrated in FIG. 24B, for the fourth-stage injection (main injection), the PCM 70 reduces the injection correction coefficient to reduce the fuel injection amount as the in-cylinder oxygen concentration decreases. Basically, since the total injection amount is in accordance with the required torque of the engine and is almost not changed according to the in-cylinder oxygen concentration, when the fuel injection amounts of the pre-stage injections are increased as described above, the main injection amount may be reduced according to those increased amounts (also see the one-dotted chain line L13 of FIG. 22).

Figure 25:
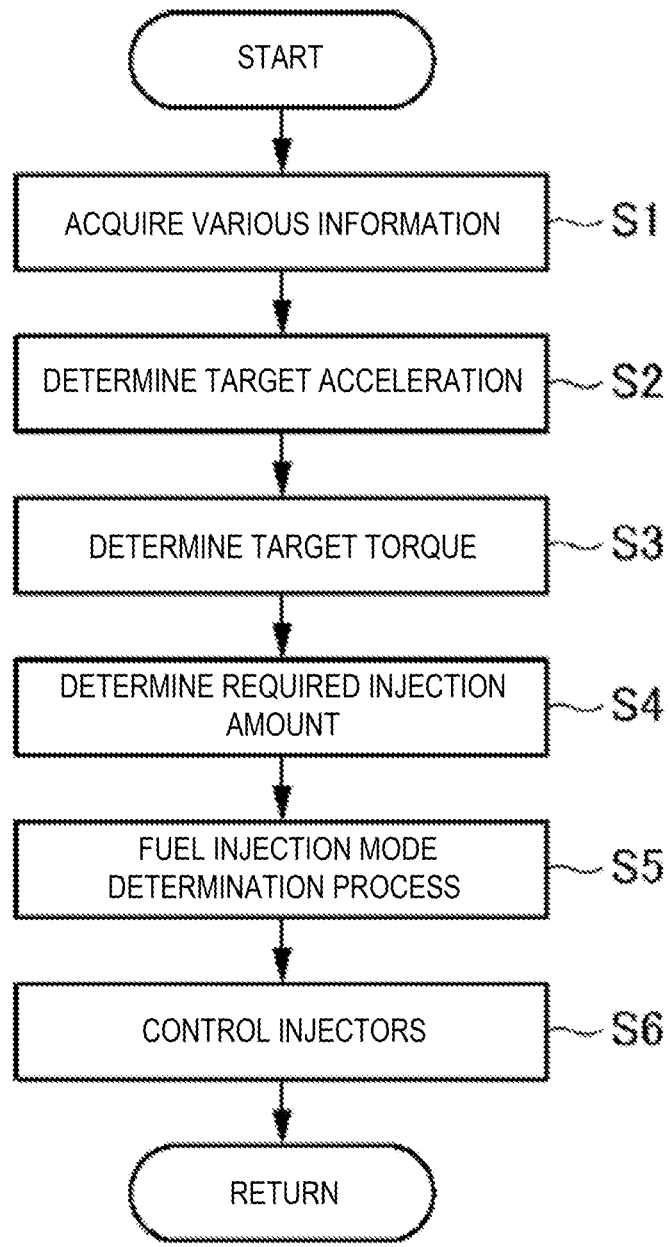
FIG. 25 is a flowchart illustrating a fuel injection control according to the embodiment of the present disclosure.

Next, a flowchart of the fuel injection control executed by the PCM 70 will be described with reference to FIG. 25. This fuel injection control is activated when an ignition switch of the vehicle is turned on, and power is supplied to the PCM 70, and is repeatedly executed.

When the fuel injection control is started, the PCM 70 acquires various information on an operating state of the vehicle at S1. For example, the PCM 70 acquires, in addition to the detection signals outputted from the various sensors SN1 to SN6 described above, information including an accelerator opening detected by an accelerator opening sensor, a vehicle speed detected by a vehicle speed sensor, a gear position currently set in a transmission of the vehicle, etc.

Next, at S2, the PCM 70 sets a target acceleration based on the information acquired at S1. For example, the PCM 70 selects an acceleration characteristic map corresponding to a current vehicle speed and gear position, from acceleration characteristic maps defined for various vehicle speeds and gear positions (they are created in advance and stored in memory, etc.). The PCM 70 determines the target acceleration corresponding to a current accelerator opening by referring to the selected acceleration characteristic map.

Next, at S3, the PCM 70 determines a target torque of the engine for achieving the target acceleration determined at S2. For example, the PCM 70 determines the target torque within a torque range which is outputtable by the engine, based on the vehicle speed, the gear position, a road surface slope, a road surface $\mu$, etc. at this time point.

Next, at S4, the PCM 70 sets a required injection amount of fuel to be injected from the injector 20 (mainly the fuel injection amount of the main injection) in order to obtain the target torque, based on the target torque determined at S3 and the engine speed obtained based on the output signal from the crank angle sensor SN1.

Next, at S5, the PCM 70 determines a fuel injection mode (including the fuel injection amount and timing, i.e., the fuel injection pattern). Particularly, in this embodiment, when the operating state of the engine is included in the partial engine load range, the PCM 70 adopts a fuel injection mode which includes the first- to fifth-stage injections and in which the fuel injection amounts applied to the first- to third-stage injections are increased stepwise toward the main injection and the injection intervals of the first- to fifth-stage injections are made substantially constant (see FIG. 22). Further, the PCM 70 determines the fuel injection amount in each fuel injection according to the engine load. Particularly, by referring to a map defining the relationship between the engine load and the injection amount ratio to the total injection amount as illustrated in FIG. 23, the PCM 70 determines the injection amount ratio according to the current engine load and obtains each fuel injection amount in the pre-stage injection.

Moreover, by referring to a map defining the relationship between the in-cylinder oxygen concentration and the injection amount correction coefficient as illustrated in FIGS. 24A and 24B, the PCM 70 applies to the injection amount correction coefficient corresponding to the current in-cylinder oxygen concentration. In this case, the PCM 70 increases each fuel injection amount of the pre-stage injection by increasing the injection amount correction coefficient as the in-cylinder oxygen concentration decreases For example, the PCM 70 calculates the in-cylinder oxygen concentration by using a given arithmetic equation based on an intake air amount, boost pressure, an EGR ratio, an exhaust gas flow rate, an oxygen concentration within the exhaust gas (or air-fuel ratio), etc.

Next, at S6, the PCM 70 controls the injector 20 based on the required injection amount determined at S4 and the fuel injection mode determined in S5. After S6, the PCM 70 terminates the fuel injection control.

<Operations and Effects>

Next, the operations and effects of this embodiment of the present disclosure are described.

According to this embodiment, when performing the fuel injections including the plurality of pre-stage injections and the main injection during the compression stroke, the PCM 70 performs the plurality of pre-stage injections at the substantially constant injection intervals while increasing each fuel injection amount as the in-cylinder oxygen concentration decreases. Thus, even if the ignition environment degrades due to the decrease in the in-cylinder oxygen concentration, by the pre-stage injections with the increased injection amounts, the penetration by the fuel injections is enhanced and the oxidation reaction of the fuel inside the cylinder is stimulated. Therefore, continuous heat generation is reliably caused in the cylinder prior to the main injection. As a result, the in-cylinder heat amount, and thus the in-cylinder pressure, are increased at the start of the main combustion to make the slope of the in-cylinder pressure up to the highest in-cylinder pressure caused by the main combustion less steep, and the high-frequency component of the knocking sound is suitably reduced. Therefore, according to this embodiment, even if the ignition environment degrades due to the decrease in the in-cylinder oxygen concentration, the knocking sound is suitably reduced.

Further, according to this embodiment, the PCM 70 increases the fuel injection amount of each fuel injection according to the increase in the engine load. As the engine load increases, although the fuel injection amount for the main injection increases and the highest in-cylinder pressure caused by the main combustion rises, by increasing the fuel injection amounts of the pre-stage injections according to the increase in the engine load, the slope of the in-cylinder pressure up to the thus-increased highest in-cylinder pressure is suitably made less steep.

Further, according to this embodiment, the PCM 70 increases the ratios of the fuel injection amounts of the pre-stage injections with respect to the total injection amount as the engine load increases, therefore, the slope of the in-cylinder pressure up to the highest in-cylinder pressure caused by the main combustion is suitably made less steep.

Moreover, according to this embodiment, the PCM 70 increases, as the fuel injection proceeds to the later stage (retarding side), the increase rate of the injection amount with respect to the increase of the total injection amount caused by the engine load increase. Therefore, when the engine load increases, the injection amounts of the pre-stage injections close to the main injection are suitably increased so that the in-cylinder heat amount is effectively increased prior to the main combustion.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Body
2 Cylinder

4 Piston
7 Crankshaft
8 Connecting Rod
20 Injector
30 Intake Passage
40 Exhaust Passage
60 Turbocharger
70 PCM

What is claimed is:

1. A method of controlling a fuel injection of a diesel engine for performing a plurality of fuel injections to cause a plurality of combustions inside a cylinder in one combustion cycle, comprising:
at a controller, computing an oxygen concentration inside the cylinder based on at least one of an intake air amount, a boost pressure, an exhaust gas recirculation ratio, an exhaust gas flow rate, an exhaust gas oxygen concentration, or an air-fuel ratio;
performing, on compression stroke, the plurality of fuel injections at substantially constant injection intervals, wherein a total injection amount of the plurality of fuel injections is increased in response to computing a decrease in the oxygen concentration; and
performing, after the plurality of fuel injections, an additional fuel injection having a larger injection amount than a respective injection amount of each of the plurality of fuel injections, near a top dead center of the compression stroke.

2. The method of claim 1, further comprising increasing the injection amount of each of the plurality of fuel injections according to an increase in a load of the diesel engine.

3. The method of claim 1, further comprising increasing a ratio of the injection amount of each of the plurality of fuel injections with respect to a total injection amount for one combustion cycle, according to an increase in a load of the diesel engine.

4. The method of claim 1, further comprising increasing, when a total injection amount for one combustion cycle is increased according to an increase in the load of the diesel engine, increase rates of the injection amounts of the plurality of fuel injections with respect to the total injection amount in a stepwise fashion.

5. A fuel injection control device of a diesel engine for performing a plurality of fuel injections to cause a plurality of combustions inside a cylinder in one combustion cycle, comprising:
a fuel supply device configured to inject fuel into the cylinder; and
a controller that computes an oxygen concentration inside the cylinder based on at least one of an intake air amount, a boost pressure, an exhaust gas recirculation ratio, an exhaust gas flow rate, an exhaust gas oxygen concentration, or an air-fuel ratio, wherein the controller is operatively coupled to the fuel supply device and is configured to:
control the fuel supply device to perform, on compression stroke, the plurality of fuel injections at substantially constant injection intervals, wherein a total injection amount of the plurality of fuel injections is increased in response to computing a decrease in the oxygen concentration; and
perform, after the plurality of fuel injections, an additional fuel injection having a larger injection amount than a respective injection amount of each of the plurality of fuel injections, near a top dead center of the compression stroke.

6. The device of claim 5, wherein the controller controls the fuel supply device to increase the injection amount of each of the plurality of fuel injections according to an increase in a load of the diesel engine.

7. The device of claim 5, wherein the controller controls the fuel supply device to increase a ratio of the injection amount of each of the plurality of fuel injections with respect to a total injection amount for one combustion cycle, according to an increase in a load of the diesel engine.

8. The device of claim 5, wherein the controller controls the fuel supply device to increase, when a total injection amount for one combustion cycle is increased according to an increase in the load of the diesel engine, increase rates of the injection amounts of the plurality of fuel injections with respect to the total injection amount in a stepwise fashion.

* * * * *